(12) United States Patent
Okuyama et al.

(10) Patent No.: US 11,898,018 B2
(45) Date of Patent: Feb. 13, 2024

(54) LIQUID COMPOSITION, POLYMER ELECTROLYTE MEMBRANE, MEMBRANE ELECTRODE ASSEMBLY AND POLYMER ELECTROLYTE FUEL CELL

(71) Applicant: AGC Inc., Tokyo (JP)

(72) Inventors: Takumi Okuyama, Tokyo (JP); Takeshi Hirai, Tokyo (JP); Susumu Saito, Tokyo (JP); Chikaya Tamitsuji, Tokyo (JP); Daisuke Jomuta, Tokyo (JP)

(73) Assignee: AGC Inc., Tokyo (JP)

(*) Notice: Subject to any disclaimer, the term of this patent is extended or adjusted under 35 U.S.C. 154(b) by 317 days.

(21) Appl. No.: 17/332,145

(22) Filed: May 27, 2021

(65) Prior Publication Data

US 2021/0284813 A1    Sep. 16, 2021

Related U.S. Application Data

(63) Continuation of application No. PCT/JP2019/047938, filed on Dec. 6, 2019.

(30) Foreign Application Priority Data

Dec. 7, 2018 (JP) .................................. 2018-230215

(51) Int. Cl.
  *C08J 5/22* (2006.01)
  *C08L 29/10* (2006.01)
  (Continued)

(52) U.S. Cl.
  CPC ............... *C08J 5/225* (2013.01); *C08L 29/10* (2013.01); *H01M 8/1004* (2013.01);
  (Continued)

(58) Field of Classification Search
  CPC ....... C08J 5/225; C08J 2329/10; C08L 29/10; H01M 8/1004; H01M 8/1039;
  (Continued)

(56) References Cited

U.S. PATENT DOCUMENTS

2007/0099052 A1* 5/2007 Frey ..................... H01M 8/1058
                                                    429/495
2008/0138685 A1   6/2008 Kaneko et al.
2020/0358119 A1* 11/2020 Tago ....................... C08L 79/04

FOREIGN PATENT DOCUMENTS

CN    101228655 A    7/2008
CN    105358592 A    2/2016
(Continued)

OTHER PUBLICATIONS

International Search Report dated Feb. 10, 2020 in PCT/JP2019/047938, filed on Dec. 6, 2019, 3 pages.

*Primary Examiner* — Daniel S Gatewood
(74) *Attorney, Agent, or Firm* — Element IP, PLC.

(57) ABSTRACT

To provide a liquid composition capable of forming a membrane excellent in durability against hydrogen peroxide or peroxide radicals and excellent in hydrogen gas barrier property; a polymer electrolyte membrane; a membrane electrode assembly; and a polymer electrolyte fuel cell.

Liquid composition comprising a liquid medium, an acid-type sulfonic acid group-containing fluorocarbon polymer of which the hydrogen gas permeation coefficient under the conditions of a temperature of 80° C. and a relative humidity of 10% is at most $2.5 \times 10^{-9}$ $cm^3 \cdot cm/(s \cdot cm^2 \cdot cmHg)$, and cerium atoms; a polymer electrolyte membrane 15 comprising the acid-type sulfonic acid group-containing fluorocarbon polymer, and cerium atoms; and a membrane electrode assembly 10 comprising an anode 13 having a catalyst layer, (Continued)

a cathode 14 having a catalyst layer, and the polymer electrolyte membrane 15 disposed between the anode 13 and the cathode 14.

18 Claims, 1 Drawing Sheet

(51) Int. Cl.
*H01M 8/1004* (2016.01)
*H01M 8/1039* (2016.01)
*H01M 8/1051* (2016.01)
*H01M 8/10* (2016.01)

(52) U.S. Cl.
CPC ....... *H01M 8/1039* (2013.01); *H01M 8/1051* (2013.01); *C08J 2329/10* (2013.01); *H01M 2008/1095* (2013.01); *H01M 2300/0082* (2013.01)

(58) Field of Classification Search
CPC ....... H01M 8/1051; H01M 2008/1095; H01M 2300/0082; H01M 8/1023; H01M 8/1067; C08K 2003/2213; C08F 8/12; C08F 214/262; C09D 127/18; H01B 1/122; Y02E 60/50

See application file for complete search history.

(56) References Cited

FOREIGN PATENT DOCUMENTS

| | | |
|---|---|---|
| JP | 3915846 B2 | 5/2007 |
| JP | 4810868 B2 | 11/2011 |
| JP | 5915658 B2 | 5/2016 |
| JP | 2016-105416 A | 6/2016 |
| JP | 2017-25242 A | 2/2017 |
| WO | WO 2007/013533 A1 | 2/2007 |
| WO | WO 2018/207325 A1 | 11/2018 |
| WO | WO-2018207325 A1 * 11/2018 ............. C08G 61/12 |
| WO | WO 2019/045064 A1 | 3/2019 |

* cited by examiner

LIQUID COMPOSITION, POLYMER ELECTROLYTE MEMBRANE, MEMBRANE ELECTRODE ASSEMBLY AND POLYMER ELECTROLYTE FUEL CELL

TECHNICAL FIELD

The present invention relates to a liquid composition, a polymer electrolyte membrane, a membrane electrode assembly and a polymer electrolyte fuel cell.

BACKGROUND ART

A polymer electrolyte fuel cell is, for example, one in which a membrane electrode assembly is sandwiched between two separators to form a cell, and a plurality of such cells are stacked. A membrane electrode assembly is one comprising an anode and a cathode each having a catalyst layer, and a polymer electrolyte membrane disposed between the anode and the cathode. A polymer electrolyte membrane is, for example, one in which a liquid composition containing an acid-type sulfonic acid group-containing fluorocarbon polymer is formed into a membrane shape.

At the time of generating electricity in a polymer electrolyte fuel cell, hydrogen peroxide or peroxide radicals derived from oxygen gas supplied to the cathode side are generated. Therefore, the polymer electrolyte membrane is required to have durability against hydrogen peroxide or peroxide radicals.

Further, at the time of generating electricity in a polymer electrolyte fuel cell, it is required that hydrogen gas supplied to the anode side will not permeate the polymer electrolyte membrane and move to the cathode side. Therefore, the polymer electrolyte membrane is required to have a low hydrogen gas permeability (a hydrogen gas barrier property).

The following one has been proposed as a polymer electrolyte membrane excellent in durability against hydrogen peroxide or peroxide radicals.

A polymer electrolyte membrane comprising an acid-type sulfonic acid group-containing fluorocarbon polymer and cerium atoms (Patent Documents 1 to 3).

PRIOR ART DOCUMENTS

Patent Documents

Patent Document 1: Japanese Patent No. 3915846
Patent Document 2: Japanese Patent No. 4810868
Patent Document 3: Japanese Patent No. 5915658

DISCLOSURE OF INVENTION

Technical Problem

However, the conventional polymer electrolyte membrane containing an acid-type sulfonic acid group-containing fluorocarbon polymer is insufficient in the hydrogen gas barrier property.

The present invention is to provide a liquid composition capable of forming a membrane excellent in durability against hydrogen peroxide or peroxide radicals and excellent in the hydrogen gas barrier property; a polymer electrolyte membrane excellent in durability against hydrogen peroxide or peroxide radicals and excellent in the hydrogen gas barrier property; a membrane electrode assembly and a polymer electrolyte fuel cell provided with a polymer electrolyte membrane excellent in durability against hydrogen peroxide or peroxide radicals and excellent in the hydrogen gas barrier property.

Solution to Problem

The present invention has the following embodiments.

<1> A liquid composition comprising
a liquid medium,
an acid-type sulfonic acid group-containing fluorocarbon polymer of which the hydrogen gas permeation coefficient under the conditions of a temperature of 80° C. and a relative humidity of 10%, is at most $2.5 \times 10^{-9}$ cm$^3$·cm/(s·cm$^2$·cmHg), or an acid-type sulfonic acid group-containing fluorocarbon polymer having units represented by the following formula u1, and
cerium atoms:

Formula u1 where $R^{F1}$ and $R^{F2}$ are each independently a $C_{1-3}$ perfluoroalkylene group.

<2> The liquid composition according to <1>, wherein the ratio of the total number of moles of the cerium atoms to the total number of moles of the sulfonic acid groups contained in the acid-type sulfonic acid group-containing fluorocarbon polymer, is from 0.001 to 0.13.

<3> The liquid composition according to <1> or <2>, wherein the ion exchange capacity of the acid-type sulfonic acid group-containing fluorocarbon polymer is from 0.5 to 2.5 meq/g dry resin.

<4> The liquid composition according to any one of <1> to <3>, wherein the hydrogen gas permeation coefficient under the conditions of a temperature of 80° C. and a relative humidity of 10%, of the acid-type sulfonic acid group-containing fluorocarbon polymer having units represented by the above formula u1, is at most $2.5 \times 10^{-9}$ cm$^3$·cm/(s·cm$^2$·cmHg).

<5> A polymer electrolyte membrane comprising
an acid-type sulfonic acid group-containing fluorocarbon polymer of which the hydrogen gas permeation coefficient under the conditions of a temperature of 80° C. and a relative humidity of 10%, is at most $2.5 \times 10^{-9}$ cm$^3$·cm/(s·cm$^2$·cmHg), or an acid-type sulfonic acid group-containing fluorocarbon polymer having units represented by the following formula u1, and
cerium atoms:

Formula u1 where $R^{F1}$ and $R^{F2}$ are each independently a $C_{1-3}$ perfluoroalkylene group.

<6> The polymer electrolyte membrane according to <5>, wherein the ratio of the total number of moles of the cerium atoms to the total number of moles of the sulfonic acid groups contained in the acid-type sulfonic acid group-containing fluorocarbon polymer is from 0.001 to 0.13.

<7> The polymer electrolyte membrane according to <5> or <6>, wherein the ion exchange capacity of the acid-type sulfonic acid group-containing fluorocarbon polymer is from 0.5 to 2.5 meq/g dry resin.

<8> The polymer electrolyte membrane according to any one of <5> to <7>, wherein the hydrogen gas permeation coefficient under the conditions of a temperature of 80° C. and a relative humidity of 10%, of the acid-type sulfonic acid group-containing fluorocarbon polymer having units represented by the above formula u1, is at most $2.5 \times 10^{-9}$ cm³·cm/(s·cm²·cmHg).

<9> A membrane electrode assembly comprising an anode having a catalyst layer, a cathode having a catalyst layer, and the polymer electrolyte membrane as defined in any one of <5> to <8>, disposed between the anode and the cathode.

<10> A polymer electrolyte fuel cell provided with the membrane electrode assembly as defined in <9>.

Advantageous Effects of Invention

The liquid composition of the present invention is capable of forming a membrane excellent in durability against hydrogen peroxide or peroxide radicals and excellent in the hydrogen gas barrier property.

The polymer electrolyte membrane of the present invention is excellent in durability against hydrogen peroxide or peroxide radicals and excellent in the hydrogen gas barrier property.

The membrane electrode assembly and the polymer electrolyte fuel cell of the present invention are provided with the polymer electrolyte membrane excellent in durability against hydrogen peroxide or peroxide radicals and excellent in the hydrogen gas barrier property.

DESCRIPTION OF EMBODIMENTS

In the present specification, a compound represented by the formula 1 is referred to as compound 1. Compounds represented by other formulas are also referred to in the same manner.

In the present specification, units represented by the formula u1 are referred to as units u1. The structural units represented by other formulas are also referred to in the same manner.

The following definitions of terms apply throughout the specification and claims.

A "sulfonic acid group" is a general term for a salt-type sulfonic acid group ($-SO_3^-M^+$, where $M^+$ is a metal ion or an ammonium ion) and an acid-type sulfonic acid group ($-SO_3^-H^+$).

An "ion exchange group" is a group in which a cation contained in the group can be exchanged to another cation.

A "unit" in a polymer is a general term for an atomic group directly formed by polymerization of one molecule of a monomer and an atomic group obtainable by chemically converting a part of the atomic group.

A "hardly soluble cerium compound" is a cerium compound of which the solubility in water at 25° C. is at most 0.1 g to 100 g of water.

The "hydrogen gas permeation coefficient" of a polymer is a value measured in accordance with JIS K 7126-2: 2006, and it is a value obtained by setting a membrane of the polymer to be 80° C., measuring the permeation amount of hydrogen gas under 10% humidification by the isobaric method, and dividing the permeation amount by the thickness of the membrane.

The "ion exchange capacity" of a polymer is obtained by the method as described in Examples.

The "TQ value" of a polymer is obtained by the method as described in Examples.

The "glass transition temperature (hereinafter referred to also as "Tg") of a polymer is obtained by the method as described in Examples.

The "conductivity" of a polymer is obtained by the method as described in Examples.

Figure 1:
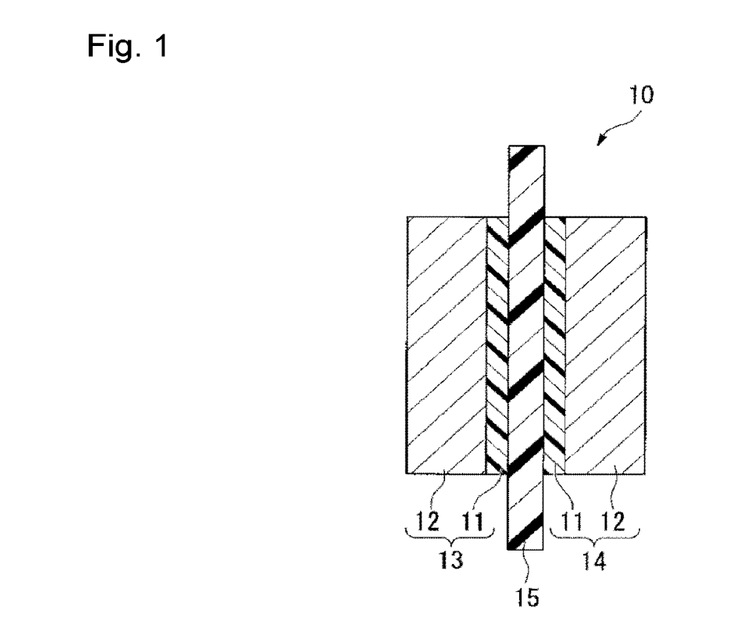
FIG. 1 is a schematic cross-sectional view showing an example of the membrane electrode assembly of the present invention.
Figure 2:
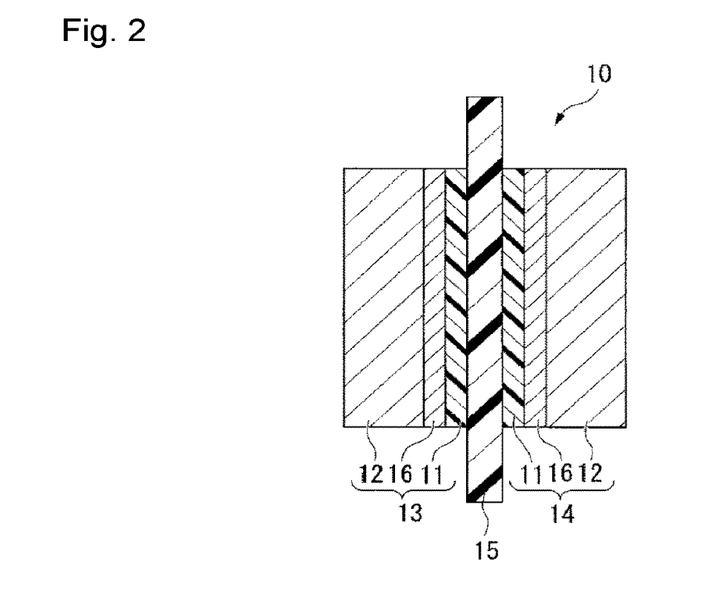
FIG. 2 is a schematic cross-sectional view showing another example of the membrane electrode assembly of the present invention.

The dimensional ratios in FIGS. 1 and 2 are different from the actual ones for convenience of explanation.

<Liquid Composition>

The liquid composition of the present invention comprises a liquid medium, a specific acid-type sulfonic acid group-containing fluorocarbon polymer (hereinafter referred to as "polymer H") and cerium atoms.

In the liquid composition, the polymer H may be dispersed in the liquid medium, may be dissolved in the liquid medium, or may be in both forms.

In the liquid composition, the cerium atoms may be dispersed as a hardly soluble cerium compound in the liquid medium, may be dissolved as cerium ions in the liquid medium, or may be in both forms.

(Liquid Medium)

The liquid medium may be water only, an organic solvent only, or one containing water and an organic solvent, and preferably one containing water and an organic solvent.

Water improves dispersibility or solubility of the polymer H in the liquid medium.

The organic solvent facilitates formation of a hardly breakable polymer electrolyte membrane.

As the organic solvent, at least one type of $C_{1-4}$ alcohols is preferred from such a viewpoint that it is thereby easy to form a hardly breakable polymer electrolyte membrane.

The $C_{1-4}$ alcohols may, for example, be methanol, ethanol, 1-propanol, 2-propanol, 1-butanol, 2,2,2-trifluoroethanol, 2,2,3,3,3-pentafluoro-1-propanol, 2,2,3,3-tetrafluoro-1-propanol, 1,1,1,3,3,3-hexafluoro-2-propanol, and 3,3,3-trifluoro-1-propanol.

The proportion of water is preferably from 10 to 99 mass %, more preferably from 20 to 99 mass %, in the total of water and the organic solvent.

The proportion of the organic solvent is preferably from 1 to 90 mass %, more preferably from 1 to 80 mass %, in the total of water and the organic solvent.

When the proportions of water and the organic solvent are within the above ranges, dispersibility of the polymer H in the dispersion medium is excellent, and it is easy to form a hardly breakable polymer electrolyte membrane.

(Polymer H)

Polymer H is a fluorocarbon polymer having perfluoromonomer units and having acid-type sulfonic acid groups ($-SO_3^-H^+$).

The polymer H in the present invention is the following polymer H1 or polymer H2.

(Polymer H1)

Polymer H1 is an acid-type sulfonic acid group-containing fluorocarbon polymer of which the hydrogen gas permeation coefficient under the conditions of a temperature of 80° C. and a relative humidity of 10% is at most $2.5 \times 10^{-9}$ cm$^3$·cm/(s·cm$^2$·cmHg).

The hydrogen gas permeation coefficient under the conditions of a temperature of 80° C. and a relative humidity of 10%, of the polymer H1, is preferably at most $2.3 \times 10^{-9}$ cm$^3$·cm/(s·cm$^2$·cmHg), more preferably $1.8 \times 10^{-9}$ cm$^3$ cm/(s·cm$^2$·cmHg). The hydrogen gas permeation coefficient under the conditions of a temperature of 80° C. and a relative humidity of 10%, of the polymer H1, is preferably at least $1.0 \times 10^{-12}$ cm$^3$·cm/(s·cm$^2$·cmHg), more preferably at least $1.0 \times 10^{-11}$ cm$^3$·cm/(s·cm$^2$·cmHg), from the viewpoint of maintaining the conductivity of the polymer H1 to be high.

The ion exchange capacity of the polymer H1 is preferably from 0.5 to 2.5 meq/g dry resin, more preferably from 1.3 to 2.3 meq/g dry resin. When the ion exchange capacity is at least the lower limit value in the above range, the conductivity of the polymer H1 becomes high, whereby a sufficient cell output can be obtained when made into a polymer electrolyte membrane for a polymer electrolyte fuel cell. When the ion exchange capacity is at most the upper limit value in the above range, swelling is suppressed when the polymer H1 is saturated, and the mechanical strength becomes high when the polymer H1 is formed into a polymer electrolyte membrane.

The water content of the polymer H1 is preferably from 30 to 300 mass %, more preferably from 40 to 200 mass %. When the water content is at least the lower limit value in the above range, the conductivity of the polymer H1 becomes high, whereby it is possible to obtain a membrane electrode assembly more excellent in power generation performance. When the water content is at most the upper limit value in the above range, the polymer H1 does not swell excessively with water, whereby the mechanical strength of the polymer electrolyte membrane can be maintained.

The perfluoromonomer units may, for example, be perfluoromonomer units not having an ion exchange group or its precursor group, or perfluoromonomer units having an ion exchange group.

The perfluoromonomer not having an ion exchange group or its precursor group may, for example, be tetrafluoroethylene (hereinafter referred to as "TFE"), hexafluoropropylene, a perfluoro(alkyl vinyl ether), or perfluoromonomers having a 5-membered ring as described in WO 2011/013578.

The perfluoromonomer units having an ion exchange group may, for example, be perfluoromonomer units having a known ion exchange group as described in WO 2017/221840, WO 2018/012374, etc., and units u1 as described later.

The polymer H1 may have units based on a monomer (hereinafter referred to as "another monomer") other than the perfluoromonomer, as the case requires, so long as the effect of the present invention is not impaired.

Another monomer may, for example, be chlorotrifluoroethylene, trifluoroethylene, vinylidene fluoride, vinyl fluoride, ethylene, propylene, a (perfluoroalkyl)ethylene, or a (perfluoroalkyl)propene.

The polymer H1 is preferably one having the following units u1, since it tends to be a polymer having a low hydrogen gas permeation coefficient. The polymer H1 is preferably one which further has TFE units, from the viewpoint of excellent mechanical properties and chemical durability.

Formula u1

Here, $R^{F1}$ and $R^{F2}$ are each independently a $C_{1-3}$ perfluoroalkylene group. $R^{F1}$ and $R^{F2}$ may be the same or different.

As $R^{F1}$ and $R^{F2}$, for example, —CF$_2$—, —CF$_2$CF$_2$—, —CF(CF$_3$)—, —CF$_2$CF$_2$CF$_2$—, —CF(CF$_2$CF$_3$)—, —CF(CF$_3$)CF$_2$—, —CF$_2$CF(CF$_3$)—, or —C(CF$_3$)(CF$_3$)— may be mentioned. From such a viewpoint that raw material is less expensive, production of compound 7 to be described later is easy, and the ion exchange capacity of the polymer H1 can be made higher, $R^{F1}$ and $R^{F2}$ are each preferably a $C_{1-2}$ perfluoroalkylene group. In the case of $C_2$, a straight chain is preferred. Specifically, —CF$_2$—, —CF$_2$CF$_2$— or —CF(CF$_3$)— is preferred, and —CF$_2$— is more preferred.

The proportions of units u1, TFE units and units other than the units u1 and TFE units among all units constituting the polymer H1 may be suitably determined depending on the characteristics and physical properties (hydrogen gas permeability, ion exchange capacity, water content, conductivity, mechanical strength, elastic modulus, softening temperature, etc.) required for the polymer H1.

The polymer H1 is obtained, for example, by converting fluorosulfonyl groups (—SO$_2$F) of the polymer F1 which will be described later, to acid-type sulfonic acid groups (—SO$_3^-$H$^+$).

As a method for converting fluorosulfonyl groups to acid-type sulfonic acid groups, there may be a method of hydrolyzing fluorosulfonyl groups of the polymer F1 to salt-type sulfonic acid groups, and changing the salt-type sulfonic acid groups to an acid type to convert them to acid-type sulfonic acid groups.

Hydrolysis is carried out, for example, by bringing the polymer F1 into contact with a basic compound in a solvent. The basic compound may, for example, be sodium hydroxide, potassium hydroxide or triethylamine. The solvent may, for example, be water, or a mixed solvent of water and a polar solvent. The polar solvent may, for example, be an alcohol (methanol, ethanol, etc.) or dimethyl sulfoxide.

Conversion to an acid type is carried out, for example, by bringing the polymer having salt-type sulfonic acid groups into contact with an aqueous solution of hydrochloric acid, sulfuric acid, nitric acid or the like. The temperature for hydrolysis and conversion to an acid type is preferably from 0 to 120° C. It is preferred to wash the polymer H1 with water after hydrolysis or conversion to an acid type.

In order to remove organic substances contained as impurities in the polymer H1, the organic substances may be decomposed by a treatment such as immersing the polymer H1 in a hydrogen peroxide solution, after hydrolysis or after conversion to an acid type.

The concentration of hydrogen peroxide in the hydrogen peroxide solution is preferably from 0.1 to 30 mass %, more preferably at least 1 mass % and less than 10 mass %. When the concentration of hydrogen peroxide in the hydrogen peroxide solution is at least the lower limit value in the above range, the effect of decomposing organic substances is sufficient. When the concentration of hydrogen peroxide in the hydrogen peroxide solution is at most the upper limit value in the above range, the polymer H1 is unlikely to be decomposed.

The temperature of the hydrogen peroxide solution is preferably from 15 to 90° C., more preferably at least 40° C. and lower than 80° C. When the temperature of the hydrogen peroxide solution is at least the lower limit value in the above range, the effect of decomposing organic substances is sufficient. When the temperature of the hydrogen peroxide solution is at most the upper limit value in the above range, hydrogen peroxide is unlikely to be decomposed.

The time for immersing the polymer H1 in the hydrogen peroxide solution may depend on the thickness of the polymer H1 and the amount of organic substances contained in the polymer H1, but, for example, when the polymer H1 is a membrane having a thickness of 50 μm, from 0.5 to 100 hours is preferred. If the immersion time is less than 0.5 hour, it is difficult to decompose organic substances inside the membrane. Even if it is immersed for more than 100 hours, the effect of further decomposing organic substances cannot be expected.

It is preferred to wash the polymer H1 with water after immersing it in a hydrogen peroxide solution. Ultrapure water is preferred as the water to be used for washing with water. In addition, treatment for conversion to an acid type may be conducted before washing with water.

The shape of the final polymer H1 after the above treatments may be in the form of powder, pellets, or a membrane.

The concentration of the polymer H1 in the liquid composition is preferably from 1 to 50 mass %, more preferably from 3 to 30 mass %. When the concentration of the polymer H1 is at least the lower limit value in the above range, a thick membrane can be stably obtained during membrane formation. When the concentration of the polymer H1 is at most the upper limit value in the above range, the viscosity of the liquid composition can be suppressed from becoming excessively high.

(Polymer F1)

Polymer F1 which is a precursor of polymer H1, is a fluorocarbon polymer having perfluoromonomer units and having fluorosulfonyl groups ($-SO_2F$).

The TQ value of the polymer F1 is preferably at least 220° C., more preferably from 225 to 360° C., further preferably from 230 to 350° C. When the TQ value is at least the lower limit value in the above range, the polymer H1 will have a sufficient molecular weight and will be excellent in mechanical strength. When the TQ value is at most the upper limit value in the above range, the solubility or dispersibility of the polymer H1 will be improved, and a liquid composition can be easily prepared. The TQ value is an index for the molecular weight of the polymer F1.

Tg of the polymer F1 is preferably from 5 to 70° C., more preferably from 15 to 55° C. When Tg is at least the lower limit value in the above range, the tackiness of the polymer F1 is suppressed, and the handleability and storage stability are improved. When Tg is at most the upper limit value in the above range, brittleness of the pellets or membrane of the polymer F1 is suppressed.

The perfluoromonomer units may, for example, be perfluoromonomer units not having an ion exchange group or its precursor group, or perfluoromonomer units having a precursor group of an ion exchange group.

The perfluoromonomer not having an ion exchange group or its precursor group may, for example, be the perfluoromonomer not having an ion exchange group or its precursor group, as described for the polymer H1.

The perfluoromonomer units having a precursor group of an ion exchange group may, for example, be perfluoromonomer units having a known fluorosulfonyl group as described in WO 2017/221840, WO 2018/012374, etc., or units u2 which will be described later.

The polymer F1 may have units based on another monomer, as the case requires, so long as the effects of the present invention are not impaired.

Another monomer may be another monomer as described for the polymer H1.

The polymer F1 is preferably one which has units u2, from such a viewpoint that it is thereby easy to obtain polymer H1 having a low hydrogen gas permeation coefficient. The polymer F1 is preferably one which further has TFE units, from such a viewpoint that it is thereby possible to obtain polymer H1 excellent in mechanical properties and chemical durability.

Formula u2

$R^{F1}$ and $R^{F2}$ are the same as $R^{F1}$ and $R^{F2}$ as described for the units u1, and the preferred forms are also the same.

The proportions of units u2, TFE units and units other than the units u2 and TFE units among all units constituting the polymer F1, may be suitably determined depending on the characteristics and physical properties (hydrogen gas permeability, ion exchange capacity, water content, conductivity, mechanical strength, elastic modulus, softening temperature, etc.) required for the polymer H1.

The polymer F1 can be produced, for example, by polymerizing a monomer component containing compound 7 which will be described later, and, as the case requires, TFE, or a monomer other than compound 7 and TFE.

The polymerization method may, for example, be a bulk polymerization method, a solution polymerization method, a suspension polymerization method, or an emulsion polymerization method. Further, the polymerization may be conducted in a liquid or supercritical carbon dioxide.

The polymerization is carried out under such a condition that radicals are generated. The method for generating radicals may be a method of irradiating radiation such as ultraviolet rays, γ-rays or electron beams, or a method of adding a radical initiator. The polymerization temperature is preferably from 10 to 150° C.

(Compound 7)

Compound 7 is used in the production of polymer F1.

Formula 7

$R^{F1}$ and $R^{F2}$ are the same as $R^{F1}$ and $R^{F2}$ as described for the units u1, and the preferred forms are also the same.

Compound 7 may, for example, be compound 7-1.

Compound 7 can be produced, for example, as follows.

Compound 1 is reacted with a sulfonating agent to obtain compound 2.

Compound 2 is reacted with a chlorinating agent to obtain compound 3.

Compound 3 is reacted with a fluorinating agent to obtain compound 4.

Compound 4 is subjected to fluorination treatment to obtain compound 5.

Compound 5 is reacted with a perfluoroallylating agent (for example, compound 6 as described later) to obtain compound 7.

Here, $R^1$ and $R^2$ are each independently a $C_{1-3}$ alkylene group. $R^1$ and $R^2$ may be the same or different.

$R^{F1}$ and $R^{F2}$ are the same as $R^{F1}$ and $R^{F2}$ as described for the units u1, and the preferred forms are also the same.

As $R^1$ and $R^2$, for example, —$CH_2$—, —$CH_2CH_2$—, —$CH(CH_3)$—, —$CH_2CH_2CH_2$—, —$CH(CH_2CH_3)$—, —$CH(CH_3)CH_2$—, —$CH_2CH(CH_3)$—, or —$C(CH_3)(CH_3)$— may be mentioned. As $R^1$ and $R^2$, a $C_{1-2}$ alkylene group is preferred from such a viewpoint that the raw material compound 1 is cheaper, production of compound 7 is easy, and the ion exchange capacity of the polymer H1 can be made higher. In the case of $C_2$, a straight chain is preferred. Specifically, —$CH_2$—, —$CH_2CH_2$— or —$CH(CH_3)$— are preferred, —$CH_2$— is more preferred.

The compound 1 may, for example, be acetone, methyl ethyl ketone, diethyl ketone, methyl propyl ketone, ethyl propyl ketone, dipropyl ketone, diisopropyl ketone, isopropyl methyl ketone, isopropyl ethyl ketone or isopropyl propyl ketone. Acetone is preferred from such a viewpoint that compound 1 is cheaper, production of compound 7 is easy, and the ion exchange capacity of polymer H1 per unit molecular weight can be made higher.

The sulfonating agent may, for example, be chlorosulfonic acid, fluorosulphonic acid, sulfur trioxide, a complex of sulfur trioxide, fuming sulfuric acid, or concentrated sulfuric acid.

The reaction temperature of the compound 1 and the sulfonating agent is preferably from 0 to 100° C. The reaction solvent can be suitably selected from solvents which themselves are less susceptible to sulfonation. The reaction solvent may, for example, be methylene chloride, chloroform, carbon tetrachloride, 1,1,1-trichloromethane, cyclohexane, hexane, petroleum ether, pentane, heptane, diethyl ether, acetonitrile, or diethyl carbonate. As the reaction solvent, two or more types may be used as mixed.

The chlorinating agent may, for example, be thionyl chloride, phosphorus pentachloride, phosphorus trichloride, phosphoryl chloride, chlorosulfonic acid, sulfuryl chloride, oxalyl chloride, or chlorine.

The reaction temperature of the compound 2 and the chlorinating agent is preferably from 0 to 100° C. When the reaction temperature is at most the upper limit value in the above range, decomposition of the compound 3 is suppressed, whereby the yield of the compound 3 is improved. When the reaction temperature is at least the lower limit value in the above range, the reaction rate is increased and the productivity is improved.

The fluorinating agent may, for example, be potassium hydrogen fluoride, sodium hydrogen fluoride, potassium fluoride, sodium fluoride, cesium fluoride, silver fluoride, or quaternary ammonium fluoride (tetraethylammonium fluoride, tetrabutylammonium fluoride, etc.), hydrogen fluoride, hydrofluoric acid, or a hydrogen fluoride complex (HF-pyridine complex, HF-triethylamine, etc.).

The reaction temperature of the compound 3 and the fluorinating agent is preferably from −30 to 100° C. The reaction solvent may be suitably selected from polar solvents or low polar solvents that are less susceptible to the fluorination reaction. The reaction solvent may, for example, be methylene chloride, chloroform, carbon tetrachloride, 1,1,1-trichloromethane, diethyl ether, dioxane, tetrahydrofuran, dimethoxyethane, diethylene glycol dimethyl ether, tetraethylene glycol dimethyl ether, dimethyl sulfoxide, sulfolane, N,N-dimethylformamide, acetonitrile, dimethyl carbonate, diethyl carbonate, ethylene carbonate, propylene carbonate or water. As the reaction solvent, two or more types may be used as mixed.

The fluorination treatment is carried out by bringing the compound 4 into contact with a fluorine gas or a fluorine compound.

The fluorine compound may, for example, be hydrogen fluoride, halogen fluoride (chlorine trifluoride, iodine pentafluoride, etc.), gaseous fluoride (boron trifluoride, nitrogen trifluoride, phosphorus pentafluoride, silicon tetrafluoride, sulfur hexafluoride, etc.), a metal fluoride (lithium fluoride, nickel (II) fluoride, etc.), a hypofluorite compound (trifluoromethyl hypofluorite, trifluoroacetyl hypofluorite, etc.), or an electrophilic fluorinating reagents (Selectfluor (registered trademark), N-fluorobenzenesulfonimide, etc.).

As the fluorination treatment, a treatment in which the compound 4 and the fluorine gas are brought into contact with each other is preferred from the viewpoint of handleability and reduction of impurities contained in the compound 5. Fluorine gas may be diluted with an inert gas such as nitrogen gas before use. The temperature of the fluorination treatment is preferably from −20 to 350° C. The reaction solvent may be suitably selected from solvents in which solubility of the compound 4 or the compound 5 is high, and the solvents themselves are not easily subjected to the fluorination treatment. The reaction solvent may, for example, be acetonitrile, chloroform, dichloromethane, trichlorofluoromethane, a perfluorotrialkylamine (perfluorotributylamine, etc.), a perfluorocarbon (perfluorohexane, perfluorooctane, etc.), a hydrofluorocarbon (1H,4H-perfluorobutane, 1H-perfluorohexane, etc.), a hydrochlorofluorocarbon (3,3-dichloro-1,1,1,2,2-pentafluoropropane, 1,3-dichloro-1,1,2,2,3-pentafluoropropane, etc.), or a hydrofluoroether ($CF_3CH_2OCF_2CF_2H$, etc.).

In addition, there may be a case where, in the presence of hydrogen fluoride (HF), compound 5 is in a state of equilibrium with an alcohol form in which hydrogen fluoride is added to the O=C< portion to form HO—CF<, or becomes the alcohol form. In the present specification, even if it is simply referred to as compound 5, it may represent either one or both of compound 5 and the alcohol form.

The perfluoroallylating agent may be compound 6.

$$CF_2=CFCF_2\text{-G} \qquad \text{Formula 6}$$

where G is $-OSO_2F$, $-OSO_2R^f$, a chlorine atom, a bromine atom or an iodine atom, and $R^f$ is a $C_{1-8}$ perfluoroalkyl group.

As the compound 6, compound 6-1 is preferred from the viewpoint of availability of raw materials, reactivity of the perfluoroallylating agent, ease of synthesis, and ease of handling.

$$CF_2=CFCF_2OSO_2F \qquad \text{Formula 6-1}$$

Compound 6-1 may be produced, for example, by reacting hexafluoropropylene with sulfur trioxide in the presence of boron trifluoride. Instead of boron trifluoride, a boron trifluoride diethyl ether complex or a Lewis acid such as trimethoxyborane, may be used.

The reaction of compound 5 with the perfluoroallylating agent is preferably carried out in the presence of a fluoride salt. As the fluoride salt, potassium fluoride, cesium fluoride, silver fluoride, quaternary ammonium fluoride, or sodium fluoride may be mentioned.

The reaction temperature of compound 5 and the perfluoroallylating agent is preferably from −70 to 40° C. The reaction solvent preferably contains an aprotic polar solvent, and more preferably consists solely of an aprotic polar solvent. The aprotic polar solvent may, for example, be monoglime, diglime, triglime, tetraglime, acetonitrile, propionitrile, adiponitrile, benzonitrile, dioxane, tetrahydrofuran, N,N-dimethylformamide, dimethyl sulfoxide, N-methylpyrrolidone, or nitroethane. As the reaction solvent, two or more types may be used as mixed.

(Polymer H2)

Polymer H2 is an acid-type sulfonic acid group-containing fluorocarbon polymer having units u1.

$$\begin{array}{c} +CF_2-CF + R^{F1}-SO_3^-H^+ \\ | \\ CF_2OCF \\ \backslash \\ R^{F2}-SO_3^-H^+ \end{array} \qquad \text{Formula u1}$$

$R^{F1}$ and $R^{F2}$ are the same as $R^{F1}$ and $R^{F2}$ as described for the units u1 of the polymer H1, and the preferred forms are also the same.

The hydrogen gas permeation coefficient under the conditions of a temperature of 80° C. and a relative humidity of 10%, of the polymer H2, is preferably in the same range as the hydrogen gas permeation coefficient under the conditions of a temperature of 80° C. and a relative humidity of 10%, of the polymer H1.

The ion exchange capacity of the polymer H2 is preferably in the same range as the ion exchange capacity of the polymer H1.

The water content of the polymer H2 is preferably in the same range as the water content of the polymer H1.

The polymer H2 may have units other than the units u1, as the case requires, so long as the effects of the present invention are not impaired.

The units other than the units u1 may be perfluoromonomer units other than the units u1, or units based on another monomer.

The perfluoromonomer and another monomer may be the perfluoromonomer and another monomer as described for the polymer H1.

The polymer H2 preferably further has TFE units from the viewpoint of excellent mechanical properties and chemical durability.

The proportions of units u1, TFE units and units other than the units u1 and TFE units among all units constituting the polymer H2, may be suitably determined depending on the characteristics and physical properties (hydrogen gas permeability, ion exchange capacity, water content, conductivity, mechanical strength, elastic modulus, softening temperature, etc.) required for the polymer H2.

The polymer H2 is obtainable, for example, by converting fluorosulfonyl groups ($-SO_2F$) of the polymer F2 as described later to acid-type sulfonic acid groups ($-SO_3^-H^+$).

The method for converting fluorosulfonyl groups to acid-type sulfonic acid groups may be the same method as the method as described for the polymer H1, and the preferred forms are also the same.

In order to remove organic substances contained as impurities in the polymer H2, the organic substances may be decomposed by a treatment such as immersing the polymer H2 in a hydrogen peroxide solution in the form of the salt type after hydrolysis or after being converted to an acid type.

The method for treating the polymer H2 may be the same method as the method as described for the polymer H1, and the preferred forms are also the same.

(Polymer F2)

Polymer F2 which is a precursor of polymer H2, is a polymer having units u2.

$$\begin{array}{c} +CF_2-CF + R^{F1}-SO_2F \\ | \\ CF_2OCF \\ \backslash \\ R^{F2}-SO_2F \end{array} \qquad \text{Formula u2}$$

$R^{F1}$ and $R^{F2}$ are the same as $R^{F1}$ and $R^{F2}$ as described for the units u1, and the preferred forms are also the same.

The TQ value of the polymer F2 is preferably at least 220° C., more preferably from 225 to 360° C., further preferably from 230 to 350° C. When the TQ value is at least the lower limit value in the above range, the polymer H2 has a sufficient molecular weight and is excellent in mechanical strength. When the TQ value is at most the upper limit value in the above range, the solubility or dispersibility of the polymer H2 is improved, and a liquid composition can be easily prepared. The TQ value is an index for the molecular weight of the polymer F2.

Tg of the polymer F2 is preferably in the same range as Tg of the polymer F1.

The polymer F2 may have another units other than the units u1, as the case requires, so long as the effects of the present invention are not impaired.

Another units may be another units as described for the polymer H2.

As the polymer F2, one further having TFE units is preferred from such a viewpoint that it is possible to obtain polymer H2 excellent in mechanical properties and chemical durability.

The proportions of units u2, TFE units and units other than the units u2 and TFE units among all units constituting the polymer F2, may be suitably determined depending on the characteristics and physical properties (hydrogen gas permeability, ion exchange capacity, water content, conductivity, mechanical strength, elastic modulus, softening temperature, etc.) required for the polymer H2.

The polymer F2 may be produced, for example, by the same method as for the polymer F1.

(Cerium Atoms)

The cerium atoms contained in the liquid composition may be in a state of a cerium metal, in a state of a hardly soluble cerium compound, or in a state of cerium ions, or may be ones having these states combined.

When the liquid composition or the polymer electrolyte membrane contains cerium ions, some of the cations of the polymer H are exchanged with the cerium ions, whereby degradation of the polymer H due to hydrogen peroxide or peroxide radicals is efficiently suppressed. The cerium ions may be +3 valent or +4 valent.

Even if the cerium atoms are contained as a cerium metal or a hardly soluble cerium compound in the liquid composition or the polymer electrolyte membrane, degradation of the polymer H due to hydrogen peroxide or peroxide radicals can be suppressed. That is, the cerium metal or the hardly soluble cerium compound itself works as a catalyst to decompose hydrogen peroxide or peroxide radicals on the surface thereof. In addition, the cerium metal or the hardly soluble cerium compound can generate cerium ions by partially dissociating or dissolving in the liquid composition or the polymer electrolyte membrane.

The cerium salt to obtain a liquid composition containing cerium ions may, for example, be cerium carbonate, cerium acetate, cerium chloride, cerium nitrate, cerium sulfate, diammonium cerium nitrate, or tetraammonium cerium sulfate, and cerium carbonate is preferred since carbonic acid can be easily removed as a gas from the liquid composition. The cerium salt may be an organometallic complex salt. The organometallic complex salt may, for example, be cerium acetylacetonate.

The hardly soluble cerium compound may, for example, be cerium phosphate, cerium oxide, cerium hydroxide, cerium fluoride, cerium oxalate, cerium tungstate, or a cerium salt of heteropolyacid. At least one type selected from cerium phosphate, cerium oxide, cerium fluoride, cerium tungstate, and a cerium salt of heteropolyacid, is preferred from the viewpoint of a highly effectiveness in suppressing degradation of the polymer H due to hydrogen peroxide or peroxide radicals. Cerium oxide is particularly preferred since it is excellent in dispersibility when added to the liquid composition.

The ratio of the total number of moles of the cerium atoms to the total number of moles of the sulfonic acid groups contained in the polymer H is preferably from 0.001 to 0.13, more preferably from 0.003 to 0.066, further preferably from 0.003 to 0.017. When the ratio of the number of cerium atoms to the number of sulfonic acid groups is at least the lower limit value in the above range, durability of the polymer electrolyte membrane to hydrogen peroxide or peroxide radicals is more excellent. When the ratio of the number of cerium atoms to the number of sulfonic acid groups is at most the upper limit value in the above range, the exchange amount when the cerium atoms are ionized and exchanged with sulfonic acid groups can be suppressed, whereby the proton conductivity of the polymer electrolyte membrane to be prepared from the liquid composition can be maintained to be high.

The liquid composition is obtainable by mixing a liquid medium, the polymer H, and at least one type selected from the group consisting of a cerium metal, a hardly soluble cerium compound and a cerium salt.

As the mixing method, for example, a method of applying shearing such as stirring to the polymer H, etc. in the liquid medium under atmospheric pressure or in a state of being sealed in an autoclave, etc., may be mentioned.

The temperature at the time of stirring is preferably from 0 to 250° C., more preferably from 20 to 150° C. If necessary, shearing such as ultrasonic waves may be applied.

Advantageous Effects

The liquid composition of the present invention as described above contains polymer H1 of which the hydrogen gas permeation coefficient under the conditions of a temperature of 80° C. and a relative humidity of 10% is at most $2.5 \times 10^{-9}$ cm$^3$·cm/(s·cm$^2$·cmHg), or polymer H2 having units u1, whereby it is possible to form a membrane excellent in hydrogen gas barrier property.

Further, since the liquid composition of the present invention contains cerium atoms, it is possible to form a membrane excellent in durability against hydrogen peroxide or peroxide radicals.

<Polymer Electrolyte Membrane>

The polymer electrolyte membrane of the present invention is a membrane comprising the polymer H and cerium atoms.

As the polymer H of the polymer electrolyte membrane of the present invention, the same one as the polymer H contained in the liquid composition of the present invention may be mentioned, and the preferred forms are also the same.

The ion exchange capacity of the polymer H of the polymer electrolyte membrane of the present invention is preferably in the same range as the polymer H contained in the liquid composition of the present invention.

As the cerium atoms, the same ones as the cerium atoms contained in the liquid composition of the present invention may be mentioned, and the preferred forms are also the same.

The preferred range of the ratio of the number of cerium atoms to the number of sulfonic acid groups contained in the polymer H is the same as the preferred range in the liquid composition of the present invention.

The thickness of the polymer electrolyte membrane is preferably from 5 to 200 μm, more preferably from 10 to 130 μm. When the thickness of the polymer electrolyte membrane is at most the upper limit value in the above range, the membrane resistance is sufficiently lowered. When the thickness of the polymer electrolyte membrane is at least the lower limit value in the above range, a sufficient hydrogen gas barrier property can be secured.

The polymer electrolyte membrane may be reinforced with a reinforcing material. The reinforcing material may, for example, be porous materials, fibers, woven fabrics, or non-woven fabrics. The material for the reinforcing material may, for example, be polytetrafluoroethylene, a TFE-hexafluoropropylene copolymer, a TFE-perfluoro(alkyl vinyl ether) copolymer, polyethylene, polypropylene, or polyphenylene sulfide.

The polymer electrolyte membrane may contain silica or a heteropolyacid (zirconium phosphate, phosphomolybdic acid, phosphotungstic acid, etc.) as a water retention agent for preventing drying.

The polymer electrolyte membrane can be formed, for example, by a method in which the liquid composition of the present invention is applied to the surface of a base film or a catalyst layer, followed by drying (cast method). When the polymer electrolyte membrane further contains a reinforcing material, the polymer electrolyte membrane can be formed, for example, by impregnating the reinforcing material with the liquid composition of the present invention and drying it.

It is preferred to conduct heat treatment in order to stabilize the polymer electrolyte membrane. The heat treatment temperature is preferably from 130 to 200° C., although it depends on the type of the polymer H. When the heat treatment temperature is at least 130° C., the polymer H will not contain excessive water. When the heat treatment temperature is at most 200° C., the thermal decomposition of sulfonic acid groups is suppressed, and the decrease in the conductivity of the polymer electrolyte membrane is suppressed.

The polymer electrolyte membrane may be treated with a hydrogen peroxide solution, as the case requires.

Since the polymer electrolyte membrane of the present invention as described above contains the polymer H, it is excellent in the hydrogen gas barrier property.

Further, since the polymer electrolyte membrane of the present invention contains cerium atoms, it is excellent in durability against hydrogen peroxide or peroxide radicals.

<Membrane Electrode Assembly>

FIG. 1 is a cross-sectional view showing an example of the membrane electrode assembly of the present invention. The membrane electrode assembly 10 comprises an anode 13 having a catalyst layer 11 and a gas diffusion layer 12, a cathode 14 having a catalyst layer 11 and a gas diffusion layer 12, and a polymer electrolyte membrane 15 which is disposed between the anode 13 and the cathode 14 in a state of being contact with the catalyst layers 11.

The catalyst layer 11 is a layer containing a catalyst and a polymer having ion exchange groups.

As the catalyst, for example, a supported catalyst in which platinum or a platinum alloy is supported on a carbon carrier, may be exemplified.

As the carbon carrier, carbon black powder may be exemplified.

As the polymer having ion exchange groups, for example, polymer H or a perfluorocarbon polymer having ion exchange groups other than polymer H, may be mentioned. The ion exchange groups of the polymer to be contained in the catalyst layer 11 are preferably an acid type, and preferably acid-type sulfonic acid groups.

The gas diffusion layer 12 has a function to uniformly diffuse gas into the catalyst layer 11 and a function as a current collector. The gas diffusion layer 12 may, for example, be carbon paper, carbon cloth, carbon felt, etc. The gas diffusion layer 12 is preferably treated for water-repellency with polytetrafluoroethylene, etc.

The polymer electrolyte membrane 15 is the polymer electrolyte membrane of the present invention.

As shown in FIG. 2, the membrane electrode assembly 10 may have a carbon layer 16 between the catalyst layer 11 and the gas diffusion layer 12.

By disposing the carbon layer 16, the gas diffusibility on the surface of the catalyst layer 11 is improved, and the power generation performance of the polymer electrolyte fuel cell are substantially improved.

The carbon layer 16 is a layer containing carbon and a nonionic fluorinated polymer.

Carbon may, for example, be carbon particles, carbon fibers, etc., and carbon nanofibers having a fiber diameter of from 1 to 1,000 nm and a fiber length of at most 1,000 μm, are preferred. The nonionic fluorinated polymer may, for example, be polytetrafluoroethylene.

When the membrane electrode assembly 10 does not have the carbon layer 16, the membrane electrode assembly 10 may be produced, for example, by the following methods.

A method in which catalyst layers 11 are formed on a polymer electrolyte membrane 15 to form a membrane catalyst layer assembly, and the membrane catalyst layer assembly is sandwiched between gas diffusion layers 12.

A method in which a catalyst layer 11 is formed on a gas diffusion layer 12 to serve as electrodes (anode 13 and cathode 14), and a polymer electrolyte membrane 15 is sandwiched between the electrodes.

When the membrane electrode assembly 10 has the carbon layer 16, the membrane electrode assembly 10 may be produced, for example, by the following methods.

A method in which a dispersion liquid containing carbon and a nonionic fluorinated polymer is applied on a base film and dried to form a carbon layer 16, a catalyst layer 11 is formed on the carbon layer, and the catalyst layer 11 and a polymer electrolyte membrane 15 are bonded, the base film is peeled off to form a membrane catalyst layer assembly having the carbon layer 16, and the membrane catalyst layer assembly is sandwiched between gas diffusion layers 12.

A method in which a dispersion liquid containing carbon and a nonionic fluorinated polymer, is applied onto a gas diffusion layer 12 and dried to form a carbon layer 16, and a membrane catalyst layer assembly having a catalyst layer 11 formed on a polymer electrolyte membrane 15, is sandwiched by the gas diffusion layers 12 having a carbon layer 16.

As the method for forming the catalyst layer 11, for example, the following methods may be mentioned.

A method in which a coating liquid for forming a catalyst layer is applied on a polymer electrolyte membrane 15, a gas diffusion layer 12, or a carbon layer 16, followed by drying.

A method in which a coating liquid for forming a catalyst layer is applied on a base film and dried to form a catalyst layer 11, and the catalyst layer 11 is transferred onto a polymer electrolyte membrane 15.

The coating liquid for forming a catalyst layer is a liquid having a polymer having ion exchange groups and a catalyst dispersed in a dispersion medium. The coating liquid for forming a catalyst layer may be prepared, for example, by mixing a liquid composition containing a polymer having ion exchange groups and a dispersion liquid of the catalyst. The coating liquid for forming a catalyst layer may further contain at least one type of metal, metal compounds, or metal ions, which contains a metal selected from the group consisting of cerium and manganese in order to further improve the durability of the catalyst layer 11.

In the membrane electrode assembly 10 as described above, since the polymer electrolyte membrane 15 contains the polymer H, the polymer electrolyte membrane 15 is excellent in the hydrogen gas barrier property.

Further, in the membrane electrode assembly 10, since the polymer electrolyte membrane 15 contains cerium atoms, the durability of the polymer electrolyte membrane 15 against hydrogen peroxide or peroxide radicals is excellent.

<Polymer Electrolyte Fuel Cell>

The polymer electrolyte fuel cell of the present invention is provided with the membrane electrode assembly of the present invention.

The polymer electrolyte fuel cell of the present invention may be one in which separators having grooves formed as gas flow fields are disposed on both sides of the membrane electrode assembly. As the separators, for example, separators made of various conductive materials, such as metal separators, carbon separators, or separators made of a material having graphite and a resin mixed, may be mentioned.

In a polymer electrolyte fuel cell, power generation is conducted by supplying a gas containing oxygen to the cathode and a gas containing hydrogen to the anode. The membrane electrode assembly may also be applied to a methanol fuel cell in which power generation is conducted by supplying methanol to the anode.

In the polymer electrolyte fuel cell of the present invention, since the polymer electrolyte membrane of the membrane electrode assembly contains the polymer H, the polymer electrolyte membrane is excellent in the hydrogen gas barrier property.

Further, in the polymer electrolyte fuel cell of the present invention, since the polymer electrolyte membrane of the membrane electrode assembly contains cerium atoms, the durability of the polymer electrolyte membrane against hydrogen peroxide or peroxide radicals is excellent.

EXAMPLES

Hereinafter, the present invention will be specifically described with reference to Examples, but the present invention is not limited to these Examples.

Ex. 1 to 7 are Production Examples, Ex. 8 is an Example of the present invention, and Ex. 9 is a Comparative Example.

Hereinafter, an acid-type sulfonic acid group-containing fluorocarbon polymer of which the hydrogen gas permeation coefficient under the conditions of a temperature of 80° C. and a relative humidity of 10%, is more than $2.5 \times 10^{-9}$ $cm^3 \cdot cm/(s \cdot cm^2 \cdot cmHg)$, or an acid-type sulfonic acid group-containing fluorocarbon polymer not having units u1, will be referred to as "polymer H'". Further, a fluorosulfonyl group-containing fluorocarbon polymer which is a precursor of polymer H' will be referred to as "polymer F'".

($^1$H-NMR)

$^1$H-NMR was measured under the conditions of frequency: 300.4 MHz and chemical shift standard: tetramethylsilane. Unless otherwise specified, $CD_3CN$ was used as the solvent. The quantification of a product was carried out from the analysis result of $^1$H-NMR and the amount of the internal standard sample (1,3-bis(trifluoromethyl)benzene) added.

($^{19}$F-NMR)

$^{19}$F-NMR was measured under the conditions of frequency: 282.7 MHz, solvent: $CD_3CN$, and chemical shift standard: $CFCl_3$. The quantification of a product was carried out from the analysis result of $^{19}$F-NMR and the amount of the internal standard sample (1,3-bis(trifluoromethyl)benzene) added.

($^{13}$C-NMR)

$^{13}$C-NMR was measured under the conditions of frequency: 75.5 MHz and chemical shift standard: tetramethylsilane. Unless otherwise specified, $CD_3CN$ was used as the solvent.

(Yield)

Yield means the yield of the reaction step×the yield of the purification step. The reaction yield means the yield of the reaction step before purifying the target product, which does not include the loss of the purification step.

(Ion Exchange Capacity)

A membrane of the polymer F or polymer F' was vacuum-dried at 120° C. for 12 hours. After measuring the mass of the membrane of the polymer after drying, the membrane of the polymer was immersed in a 0.85 mol/g sodium hydroxide solution (solvent: water/methanol=10/90 (mass ratio)) at 60° C. for at least 72 hours to hydrolyze fluorosulfonyl groups. The ion exchange capacity of the polymer F or polymer F' was obtained by back-titration of the sodium hydroxide solution after the hydrolysis with 0.1 mol/L hydrochloric acid. In the present specification, the ion exchange capacity of the polymer H or polymer H' is described as being the same as the ion exchange capacity of the polymer F or polymer F' being a precursor.

(Proportions of the Respective Units)

The proportions of the respective units in the polymer F or polymer F' were calculated from the ion exchange capacity of the polymer F or polymer F'.

The proportions of the respective units in the polymer H or polymer H' correspond to the proportions of the respective units in the polymer F or polymer F', and therefore, they are omitted.

(TQ Value)

By using a flow tester (CFT-500A, manufactured by Shimadzu Corporation) equipped with a nozzle having a length of 1 mm and an inner diameter of 1 mm, the polymer F or polymer F' was melt-extruded while changing the temperature under the condition of an extrusion pressure of 2.94 MPa (gauge pressure). The temperature (TQ value) at which the extrusion amount of the polymer F or polymer F' became 100 $mm^3$/sec was obtained. The higher the TQ value, the larger the molecular weight of the polymer.

(Dynamic Viscoelasticity)

With respect to a membrane of the polymer F or polymer F', dynamic viscoelasticity measurement was conducted by using a dynamic viscoelasticity measuring device (manufactured by IT Keisoku Seigyo K.K., DVA-225) under the conditions of a sample width: 5.0 mm, grip length: 15 mm, measurement frequency: 1 Hz, temperature rise rate: 2° C./min, and tension mode. tan δ (loss tangent) was calculated from the ratio (E"/E') of loss elastic modulus E" to storage elastic modulus E', and a tan δ-temperature curve was prepared. A value obtained by reading the peak temperature between −100 and 200° C. from the tan δ-temperature curve, was taken as Tg of the polymer F or polymer F'. Further, with respect to a membrane of the polymer H or polymer H', dynamic viscoelasticity measurement was conducted in the same manner, a storage elastic modulus E'-temperature curve was prepared, and a value obtained by reading the storage elastic modulus at 120° C. was taken as the elastic modulus at 120° C. of the polymer H or polymer H'.

(Conductivity)

A substrate having 4-terminal electrodes disposed at 5 mm intervals, was brought into close contact with a membrane of the polymer H or polymer H' having a width of 5 mm, and by a known 4-terminal method, the resistance of the membrane of the polymer H or polymer H' was measured at AC: 10 kHz and voltage: 1 V under constant temperature and humidity conditions of temperature: 80° C. and relative humidity: 50%, and the conductivity was calculated. The reference size and thickness of the membrane used in the calculation were measured under the conditions of temperature: 23° C. and relative humidity: 50% RH.

(Water Content)

A membrane of the polymer H or polymer H' was immersed in hot water at 80° C. for 16 hours and then cooled until the water temperature became at most 25° C. The membrane of the polymer H or polymer H' was taken out, water on the surface of the membrane was wiped off with a filter paper, and the mass W1 of the membrane of the polymer H or polymer H' was measured. After the membrane of the polymer H or polymer H' was dried in a glove box purged with nitrogen for at least 48 hours, the mass W2 of the membrane of the polymer H or polymer H' was measured in the glove box. The water content (mass basis) was calculated from the following formula I.

Water content=$(W1-W2)/W2 \times 100$    Formula I (Hydrogen Gas Permeation Coefficient 1)

The hydrogen gas permeation coefficient of a polymer electrolyte membrane was measured in accordance with JIS K 7126-2: 2006. As a measuring device, a gas permeability measuring device (GTR-100XFAG, manufactured by GTR TEC Corporation) was used.

A polymer electrolyte membrane having an effective permeation area of 9.62 cm$^2$ was kept at 80° C., and on the first surface, hydrogen gas having the relative humidity adjusted to be 10% was allowed to flow at 30 mL/min, and on the second surface, argon gas having the relative humidity adjusted to be 10% was allowed to flow at 30 mL/min. The hydrogen gas permeating to the argon gas was detected by gas chromatography, and the amount of hydrogen gas permeated, calculated as volume at 25° C. and 1 atm, was obtained. By using the obtained amount of hydrogen gas permeated, the permeability of the gas permeated per second per 1 cm$^2$ of the membrane area and per a pressure difference of 1 cmHg of the permeated gas, was obtained, and the value converted as a 1 cm thick membrane was adopted as the hydrogen gas permeation coefficient. Here, the reference size and thickness of the membrane used in the calculation were measured under the conditions of a temperature of 23° C. and a relative humidity of 50% RH.

(Hydrogen Gas Permeation Coefficient 2)

The value obtainable by measurement in the same manner as for the hydrogen gas permeability coefficient 1 except that the relative humidity of the hydrogen gas allowed to flow on the first surface and the second surface was adjusted to be 20%, was adopted as the gas permeation coefficient 2.

(Initial Power Generation Characteristics)

The membrane electrode assembly is incorporated into a power generation cell, and while the temperature of the membrane electrode assembly is maintained at 95° C., hydrogen gas (utilization rate 70%) is supplied to the anode, and oxygen (utilization rate 50%) is supplied to the cathode, each of which is pressurized to 151 kPa (absolute pressure). The humidity of the gas is 20% RH for both hydrogen and oxygen, and the cell voltage when the current density is 1 A/cm$^2$ is recorded and evaluated in accordance with to the following standards.

⊚: The cell voltage is at least 0.630 V.

○: The cell voltage is at least 0.615 V and less than 0.630 V.

Δ: The cell voltage is at least 0.600 V and less than 0.615 V.

x: The cell voltage is less than 0.600 V.

(Durability)

The membrane electrode assembly is incorporated into a power generation cell, and an open circuit voltage test is conducted as an acceleration test. In the test, hydrogen (utilization rate 50%) and oxygen (utilization rate 50%) corresponding to a current density of 0.2 A/cm$^2$ at ambient pressure, are supplied to the anode and cathode, respectively, and the change over time of the open circuit voltage is recorded at a cell temperature of 120° C., and relative humidity of hydrogen and oxygen: 20% RH, and evaluated in accordance with the following standards.

⊚: The decrease in the open circuit voltage after expiration of 500 hours is less than 50 mV, as compared with the initial open circuit voltage.

○: The decrease in the open circuit voltage after expiration of 100 hours is less than 50 mV as compared with the initial open circuit voltage, but the decrease in the open circuit voltage after expiration of 500 hours is at least 50 mV as compared with the initial open circuit voltage.

x: The decrease in the open circuit voltage after expiration of 100 hours is at least 50 mV as compared with the initial open circuit voltage.

(Hydrogen Leak Amount)

The hydrogen leak amount that permeates through an electrolyte membrane of a membrane electrode assembly from the anode side to the cathode side, is quantified as the oxidation current value of hydrogen on the cathode side by the linear sweep voltammetry method. In the test, hydrogen (0.05 mL/min) and nitrogen (0.2 mL/min) are, respectively, supplied to the anode and the cathode at ambient pressure, and at a cell temperature of 80° C. and a relative humidity of hydrogen and nitrogen being 30% RH, the potential on the cathode side is swept from 0.05 V to 0.5 V at a sweep rate of 0.5 mV/sec with the anode side as the reference electrode. In the relation of the current density to the potential, the value of the intercept of the linear approximation formula in the range of from 0.4 to 0.5 V is taken as the hydrogen leak current value and evaluated in accordance with the following standards.

⊚: The hydrogen leak current value is at most 1 mA/cm$^2$.

○: The hydrogen leak current value is more than 1 mA/cm$^2$ and at most 1.4 mA/cm$^2$ x: The hydrogen leak current value is more than 1.4 mA/cm$^2$.

Abbreviations

TFE: Tetrafluoroethylene,
PSVE: $CF_2$=$CFOCF_2CF(CF_3)OCF_2CF_2SO_2F$,
P2SVE: $CF_2$=$CFOCF_2CF(CF_2OCF_2CF_2SO_2F)OCF_2CF_2SO_2F$,
sPSVE: $CF_2$=$CFOCF_2CF_2SO_2F$,
PFtBPO: $(CF_3)_3COOC(CF_3)_3$,
tBPO: $(CH_3)_3COOC(CH_3)_3$,
AIBN: $(CH_3)_2C(CN)N$=$NC(CH_3)_2(CN)$,
IPP: $(CH_3)_2CHOC(O)OOC(O)OCH(CH_3)_2$,
V-601: $CH_3OC(O)C(CH_3)_2$—N=N—$C(CH_3)_2C(O)OCH_3$,
HFC-52-13p: $CF_3(CF_2)_5H$,
HFE-347pc-f: $CF_3CH_2OCF_2CF_2H$,
HCFC-225cb: $CClF_2CF_2CHClF$,
HCFC-141b: $CH_3CCl_2F$.

Ex. 1

Ex. 1-1

Into a 2 L four-necked flask equipped with a stirrer, a condenser, a thermometer and a dropping funnel, 560 g of chlorosulfonic acid was charged under nitrogen gas sealing. The flask was cooled in an ice bath, and while keeping the internal temperature below 20° C., a mixed solution of 139.5 g of compound 1-1 and 478.7 g of dichloromethane was added dropwise over 20 minutes. During the dropping, heat generation and gas generation were observed. After completion of the dropping, the flask was set in an oil bath, and the reaction was conducted for 7 hours while keeping the internal temperature at from 30 to 40° C. The reaction proceeded with the generation of gas, and a white solid was precipitated. After the reaction, the pressure inside the flask was reduced, and dichloromethane was distilled off. A yellowish white solid remained in the flask. When the solid was analyzed by $^1$H-NMR, it was confirmed that compound 2-1 was formed.

Formula 1-1　　　Formula 2-1

NMR spectrum of compound 2-1:
$^1$H-NMR (solvent: D$_2$O): 4.27 ppm (—CH$_2$—, 4H, s).
$^{13}$C-NMR (solvent: D$_2$O): 62.6 ppm (—CH$_2$—), 195.3 ppm (C=O).

Ex. 1-2

Compound 2-1 obtained in Example 1-1 was used as it was in the next reaction without being isolated. 2,049 g of thionyl chloride was added to the flask in Ex. 1-1. The flask was heated to 80° C. and refluxed for 15 hours. As the reaction proceeded, the reflux temperature increased from 52° C. to 72° C. Gas generation was confirmed during the reaction. The point at which compound 2-1 was completely dissolved and the generation of gas subsided, was taken as the reaction end point. When the reaction solution was transferred to a 2 L separable flask and left to cool for 9 hours while sealing the gas phase portion with nitrogen gas, a dark brown solid was precipitated in the separable flask. Unreacted thionyl chloride was removed by decantation. Toluene was added to wash the precipitated solid, and the toluene was removed again by decantation. Toluene washing was carried out a total of 3 times, and the total amount of toluene used was 1,207 g. The precipitated solid was dried at 25° C. for 71 hours under a nitrogen gas stream. The dried solid was recovered and analyzed by $^1$H-NMR, and it was confirmed that 356.5 g of compound 3-1 having a purity of 96.2% was obtained. The yield based on compound 1-1 became 56.0%.

Formula 2-1　　　Formula 3-1

NMR spectrum of compound 3-1:
$^1$H-NMR: 5.20 ppm (—CH$_2$—, 4H, s).
$^{13}$C-NMR: 72.3 ppm (—CH$_2$—), 184.6 ppm (C=O).

Ex. 1-3

Into a 1 L four-necked flask equipped with a stirrer, a condenser and a thermometer, 90.0 g of compound 3-1 and 750 mL of acetonitrile were charged under nitrogen gas sealing. The flask was cooled in an ice bath, and 110.3 g of potassium hydrogen fluoride was added with stirring. Heat generation associated with the addition was slight. The ice bath was changed to a water bath, and the reaction was carried out for 62 hours while maintaining the internal temperature at from 15 to 25° C. Along with the reaction, a fine white solid was produced. The reaction solution was transferred to a pressurized filter, and unreacted potassium hydrogen fluoride and the product were separated by filtration. Acetonitrile was added to the filter, and the separated solid was washed until the filtrate became transparent, and the washing solution was recovered. Acetonitrile was distilled off by applying a filtrate and a washing solution to an evaporator. 950 mL of toluene was added to the solid remaining after drying, and the mixture was heated to 100° C. to dissolve the solid in toluene. The dissolved liquid was filtered by gravity filtration to remove undissolved components. When the filtrate was transferred to a 1 L separable flask and left to cool for 14 hours while sealing the gas phase portion with nitrogen gas, light brown needle-like crystals were precipitated in the separable flask. The crystals were washed with toluene and dried at 25° C. for 30 hours under a nitrogen gas stream. When the dried solid was recovered and analyzed by $^1$H-NMR and $^{19}$F-NMR, it was confirmed that 58.1 g of compound 4-1 having a purity of 97.6% was obtained. The yield based on compound 3-1 was 72.3%.

Formula 3-1　　　Formula 4-1

NMR spectrum of compound 4-1:
$^1$H-NMR: 4.97 ppm (—CH$_2$—, 4H, d, J=3.1 Hz).
$^{19}$F-NMR: 62.4 ppm (—SO$_2$F, 2F, t, J=3.1 Hz).
$^{13}$C-NMR: 60.7 ppm (—CH$_2$—), 184.9 ppm (C=O).

Ex. 1-4

Into a 200 mL nickel autoclave, 9.93 g of compound 4-1 and 89.7 g of acetonitrile were charged. The autoclave was cooled, nitrogen gas was fed at a flow rate of 6.7 L/hr while maintaining the internal temperature at from 0 to 5° C., and the reaction solution was bubbled for 1 hour. While maintaining the temperature of the reaction solution at from 0 to 5° C., a mixed gas of fluorine gas and nitrogen gas (mixing ratio=10.3 mol %/89.7 mol %) was introduced at a flow rate of 6.7 L/hr over 6 hours. Nitrogen gas was fed again at a flow rate of 6.7 L/hr, and the reaction solution was bubbled for 1 hour. 103.2 g of the reaction solution was recovered from the autoclave. When the reaction solution was quantitatively analyzed by $^{19}$F-NMR, it was confirmed that the compound 5-1 was contained in an amount of 8.4 mass %. The reaction yield based on compound 4-1 was 66%.

Formula 4-1　　　Formula 5-1

NMR spectrum of compound 5-1:
$^{19}$F-NMR: −104.1 ppm (—CF$_2$—, 4F, s), 45.8 ppm (—SO$_2$F, 2F, s).

Ex. 1-5

Into a 200 mL nickel autoclave, 19.9 g of compound 4-1 and 85.6 g of acetonitrile were charged. The autoclave was cooled, nitrogen gas was fed at a flow rate of 6.7 L/hr while maintaining the internal temperature at from 0 to 5° C., and the reaction solution was bubbled for 1 hour. While maintaining the temperature of the reaction solution at from 0 to 5° C., a mixed gas of fluorine gas and nitrogen gas (mixing ratio=10.3 mol %/89.7 mol %) was introduced at a flow rate of 16.4 L/hr over 6.5 hours. Nitrogen gas was fed again at a flow rate of 6.7 L/hr, and the reaction solution was bubbled for 1 hour. 109.6 g of the reaction solution containing compound 5-1 was recovered from the autoclave.

Ex. 1-6

Into a 200 mL nickel autoclave, 20.1 g of compound 4-1 and 80.1 g of acetonitrile were charged. The autoclave was cooled, nitrogen gas was fed at a flow rate of 6.7 L/hr while maintaining the internal temperature at from 0 to 5° C., and the reaction solution was bubbled for 1 hour. While maintaining the temperature of the reaction solution at from 0 to 5° C., a mixed gas of fluorine gas and nitrogen gas (mixing ratio=20.0 mol %/80.0 mol %) was introduced at a flow rate of 8.4 L/hr over 6 hours. Nitrogen gas was fed again at a flow rate of 6.7 L/hr, and the reaction solution was bubbled for 1 hour. 107.1 g of the reaction solution containing compound 5-1 was recovered from the autoclave.

Ex. 1-7

Into a 50 mL four-necked flask equipped with a stirrer, a condenser, a thermometer and a dropping funnel, 1.65 g of potassium fluoride and 7.8 mL of diethylene glycol dimethyl ether (diglyme) were charged. The flask was cooled in an ice bath and stirred, and while maintaining the internal temperature at from 0 to 10° C., 8.43 g of the reaction solution obtained in Ex. 1-4 was added dropwise by using a plastic syringe. Strong heat generation was confirmed, and it took 15 minutes for the dropping. After completion of the dropping, the ice bath was replaced with a water bath, and the reaction was carried out at from 15 to 20° C. for 1 hour. The mixture was cooled again in an ice bath, and 6.56 g of compound 6-1 was added dropwise from the dropping funnel while maintaining the temperature of the reaction solution at from 0 to 10° C. After completion of the dropping, the ice bath was replaced with a water bath, and the reaction was conducted at from 20 to 25° C. for 3.5 hours. A by-product solid was removed from the reaction solution by suction filtration, and the filtrate was collected. The filtered residual solid was washed with a suitable amount of acetonitrile, and the washing liquid was mixed with the filtrate. When 37.1 g of the filtrate was quantitatively analyzed by $^{19}$F-NMR, it was confirmed that compound 7-1 was contained in an amount of 2.04 mass %. The reaction yield based on compound 4-1 was 46.6%.

NMR spectrum of compound 7-1:
$^{19}$F-NMR: −191.5 ppm (CF$_2$=CF—, 1F, ddt, J=116, 38, 14 Hz), −133.8 ppm (—O—CF—, 1F, tt, J=21.3, 6.1 Hz), −103.1 ppm (—CF$_2$—SO$_2$F, 4F, m), −101.5 ppm (CF$_2$=CF—, 1F, ddt, J=116, 49, 27 Hz), −87.6 ppm (CF$_2$—CF—, 1F, ddt, J=49, 38, 7 Hz), −67.5 ppm (—CF$_2$—O—, 2F, m), 46.8 ppm (—SO$_2$F, 2F, s).

Ex. 1-8

Into a 500 mL four-necked flask equipped with a stirrer, a condenser, a thermometer and a dropping funnel, 36.6 g of potassium fluoride and 125.6 g of acetonitrile were charged. The flask was cooled in an ice bath and stirred to keep the internal temperature at from 0 to 10° C., and 79.8 g of the reaction solution obtained in Ex. 1-5 was added dropwise by using a plastic dropping funnel. Strong heat generation was confirmed, and it took 23 minutes for the dropping. After completion of the dropping, the ice bath was replaced with a water bath, and the reaction was carried out at from 20 to 30° C. for 5.5 hours. The mixture was cooled again in an ice bath, and 146.0 g of compound 6-1 was added dropwise from the dropping funnel while maintaining the temperature of the reaction solution to be from 0 to 10° C. After completion of the dropping, the ice bath was replaced with a water bath, and the reaction was conducted at from 15 to 25° C. for 16 hours. Suction filtration was performed in the same manner as in Ex. 1-7, and 412.3 g of the obtained filtrate was quantitatively analyzed by $^{19}$F-NMR, and it was confirmed that compound 7-1 was contained in an amount of 3.93 mass %. The reaction yield based on compound 4-1 was 55.9%. The filtrate was distilled under reduced pressure to isolate compound 7-1 as a fraction having a boiling point of 97.2° C./10 kPa. The gas chromatography purity was 98.0%.

Ex. 1-9

Into a 50 mL four-necked flask equipped with a stirrer, a condenser, a thermometer and a dropping funnel, 3.70 g of potassium fluoride and 10.9 g of acetonitrile were charged. The flask was cooled in an ice bath and stirred, and 10.2 g of the reaction solution obtained in Ex. 1-6 was added dropwise by using a plastic syringe while keeping the internal temperature to be from 0 to 10° C. Strong heat generation was confirmed, and it took 8 minutes for dropping. After completion of the dropping, the ice bath was replaced with a water bath, and the reaction was carried out at from 20 to 30° C. for 3 hours. The mixture was cooled again in an ice bath, and 14.6 g of compound 6-1 was added dropwise from the dropping funnel while maintaining the temperature of the reaction solution at from 0 to 10° C. After completion of the dropping, the ice bath was replaced with a water bath, and the reaction was carried out at from 15 to 25° C. for 17 hours. Suction filtration was performed in the same manner as in Ex. 1-7, and 55.9 g of the obtained filtrate was quantitatively analyzed by $^{19}$F-NMR, and it was confirmed that compound 7-1 was contained in an amount of 4.77 mass %. The reaction yield based on compound 4-1 was 69.6%. The reaction yield based on compound 1-1 (reaction yield in the entire monomer synthesis step) was 28.2%.

Ex. 2

Ex. 2-1

Into an autoclave (internal volume 100 mL, made of stainless steel), 70.0 g of compound 7-1 was put, cooled with liquid nitrogen, and degassed. Into the autoclave, 2.53 g of TFE was introduced and heated in an oil bath until the internal temperature reached 100° C. The pressure at this time was 0.29 MPa (gauge pressure). A mixed solution of 36.3 mg of PFtBPO as a polymerization initiator, and 2.58 g of HFC-52-13p, was injected into the autoclave. Furthermore, nitrogen gas was introduced from the injection line, and the injection liquid in the injection line was completely pushed in. As a result of diluting TFE in the gas phase portion by this operation, the pressure increased to 0.56 MPa (gauge pressure). Polymerization was carried out by continuously adding TFE while maintaining the pressure at 0.56 MPa (gauge pressure). When the amount of TFE added reached 4.03 g in 9.5 hours, the inside of the autoclave was cooled to stop the polymerization, and the gas in the system was purged. The reaction solution was diluted with HFC-52-13p, HFE-347pc-f was added, and the polymer was precipitated and filtered. Then, the operation of stirring the polymer in HFC-52-13p and reprecipitating it with HFE-347pc-f, was repeated twice. Vacuum drying was conducted at 120° C., to obtain polymer F-1 as a copolymer of TFE and compound 7-1. The results are shown in Table 1.

Ex. 2-2, Ex. 2-3

The respective conditions in Ex. 2-1 were changed as shown in Table 1. However, in Ex. 2-2 and Ex. 2-3, the initial charging of TFE was not performed, but instead, after heating to the polymerization temperature, TFE was charged to the pressure before dilution with nitrogen gas as shown in Table 1. In Ex. 2-3, instead of injecting the polymerization initiator in an initial batch, after diluting with nitrogen gas to a predetermined polymerization pressure, a 0.20 mass % solution of tBPO dissolved in compound 7-1 was added at the start of polymerization and intermittently from the injection line every 30 minutes (the total amount of the polymerization initiator and compound 7-1 added is shown in Table 1). Other than that, polymer F-2 and polymer F-3 were obtained in the same manner as in Ex. 2-1. The results are shown in Table 1.

TABLE 1

|  | Ex. 2-1 | Ex. 2-2 | Ex. 2-3 |
| --- | --- | --- | --- |
| Reactor volume [mL] | 100 | 100 | 100 |
| Compound 7-1 [g] | 70.0 | 80.0 | 119.4 |
| Initially charged TFE [g] | 2.53 | — | — |
| HFC-52-13p [g] | 2.58 | 4.23 | 0 |
| Polymerization initiator | PFtBPO | PFtBPO | tBPO |
| Amount of polymerization initiator [mg] | 36.3 | 41.4 | 18.8 |
| Polymerization temperature [° C.] | 100 | 100 | 150 |
| Pressure before dilution with nitrogen gas [MPaG] | 0.29 | 0.29 | 0.41 |
| Polymerization pressure [MPaG] | 0.56 | 0.56 | 0.80 |
| Continuously added TFE [g] | 4.03 | 5.59 | 15.2 |
| Polymerization time [hr.] | 9.5 | 6.9 | 8.0 |
| Obtained polymer F | F-1 | F-2 | F-3 |
| Yield of polymer F [g] | 6.4 | 8.47 | 29.9 |
| Compound 7-1 units [mol %] | 13.8 | 12.4 | 18.2 |
| TFE units [mol %] | 86.2 | 87.6 | 81.8 |
| Ion exchange capacity [meq/g dry resin] | 1.87 | 1.74 | 2.24 |
| TQ value [° C.] | 238 | 298 | 301 |
| Tg [° C.] | 39 | 41 | 35 |

Ex. 3

Ex. 3-1 to Ex. 3-3

Using the polymers F-1 to F-3 obtained in Ex. 2, membranes of polymer H-1 to polymer H-3 were obtained by the following method.

Polymer F was press-molded at a temperature 10° C. higher than the TQ value or 260° C., whichever was lower, and 4 MPa (gauge pressure), to obtain a membrane of polymer F (thickness 100 to 250 μm). In an alkaline aqueous solution shown in Table 2, the membrane of polymer F was immersed at 80° C. for 16 hours to hydrolyze —SO$_2$F of polymer F and convert it to —SO$_3$K. Further, the membrane of the polymer was immersed in a 3 mol/L hydrochloric acid aqueous solution at 50° C. for 30 minutes, and then immersed in ultrapure water at 80° C. for 30 minutes. The cycle of immersion in the aqueous hydrochloric acid solution and immersion in ultrapure water was carried out a total of 5 times to convert —SO$_3$K of the polymer to —SO$_3$H. Washing with ultrapure water was repeated until the pH of the water in which the membrane of the polymer was immersed became 7. The membrane of the polymer was sandwiched between filter papers and air-dried to obtain a membrane of polymer H. The results are shown in Table 2.

TABLE 2

|  | Ex. 3-1 | Ex. 3-2 | Ex. 3-3 |
| --- | --- | --- | --- |
| Polymer F used | F-1 | F-2 | F-3 |
| Alkaline aqueous solution used | Aqueous solution A | Aqueous solution C | Aqueous solution A |
| Obtained polymer H | H-1 | H-2 | H-3 |
| Conductivity [S/cm] | 0.136 | 0.123 | 0.182 |
| Elastic modulus at 120° C. [MPa] | 95.7 | 119 | 89.8 |
| Water content [mass %] | 136 | 93 | 238 |

In Tables 2 and 4, the aqueous solution A is potassium hydroxide/water=20/80 (mass ratio), the aqueous solution B is potassium hydroxide/dimethylsulfoxide/water=15/30/55 (mass ratio), and the aqueous solution C is potassium hydroxide/methanol/water=15/20/65 (mass ratio).

Ex. 4

Ex. 4-1

Into a Hastelloy autoclave having an internal volume of 230 mL, 123.8 g of PSVE, 35.2 g of HCFC-225cb, and 63.6 mg of AIBN were put, cooled with liquid nitrogen, and degassed. The temperature was raised to 70° C., TFE was introduced into the system, and the pressure was maintained at 1.14 MPa (gauge pressure). TFE was continuously added so that the pressure became constant at 1.14 MPa (gauge pressure). After 7.9 hours, when the amount of TFE added reached 12.4 g, the autoclave was cooled, and the gas in the system was purged to terminate the reaction. The polymer solution was diluted with HCFC-225cb, and then HCFC-141b was added for precipitation. After washing with HCFC-225cb and HCFC-141b, the mixture was dried to obtain 25.1 g of polymer F'-1 which is a copolymer of TFE and PSVE. The results are shown in Table 3.

Ex. 4-2 to Ex. 4-4

Except that the conditions of Ex. 4-1 were changed as shown in Table 3, TFE and P2SVE or sPSVE were copolymerized in the same manner as in Ex. 4-1 to obtain polymers F'-2 to F'-4. The results are shown in Table 3.

TABLE 3

|  | Ex. 4-1 | Ex. 4-2 | Ex. 4-3 | Ex. 4-4 |
| --- | --- | --- | --- | --- |
| Reactor volume [mL] | 230 | 2500 | 230 | 100 |
| SO$_2$F group-containing monomer | PSVE | P2SVE | sPSVE | sPSVE |
| Amount of SO$_2$F group-containing monomer [g] | 123.8 | 1996 | 160.2 | 90.0 |
| HCFC-225cb [g] | 35.2 | 20.0 | 1.00 | 1.00 |
| Polymerization initiator | AIBN | V-601 | IPP | IPP |
| Amount of polymerization initiator [mg] | 63.6 | 399.0 | 128.1 | 90.5 |
| Polymerization temperature [° C.] | 70 | 57 | 40 | 40 |
| Polymerization pressure [MPaG] | 1.14 | 0.76 | 0.53 | 0.90 |

TABLE 3-continued

|  | Ex. 4-1 | Ex. 4-2 | Ex. 4-3 | Ex. 4-4 |
| --- | --- | --- | --- | --- |
| Polymerization time [hr.] | 7.9 | 14.5 | 10.0 | 4.5 |
| Obtained polymer F' | F'-1 | F'-2 | F'-3 | F'-4 |
| Yield of polymer F' [g] | 25.1 | 382.2 | 22.5 | 22.2 |
| Units based on $SO_2F$ group-containing monomer [mol %] | 17.7 | 19.6 | 25.3 | 16.1 |
| TFE units [mol %] | 82.3 | 80.4 | 74.7 | 83.9 |
| Ion exchange capacity [meq/g dry resin] | 1.10 | 1.93 | 1.74 | 1.25 |
| TQ value [° C.] | 225 | 240 | 255 | 317 |
| Tg [° C.] | 8 | 0 | — | 30 |

Ex. 5

Ex. 5-1 to 5-4

In the same manner as in Ex. 3, polymers F'-1 to F'-4 were treated to obtain membranes of polymers H'-1 to H'-4. The results are shown in Table 4.

TABLE 4

|  | Ex. 5-1 | Ex. 5-2 | Ex. 5-3 | Ex. 5-4 |
| --- | --- | --- | --- | --- |
| Polymer F' used | F'-1 | F'-2 | F'-3 | F'-4 |
| Alkaline aqueous solution used | Aqueous solution A | Aqueous solution A | Aqueous solution C | Aqueous solution B |
| Obtained polymer H' | H'-1 | H'-2 | H'-3 | H'-4 |
| Conductivity [S/cm] | 0.050 | 0.171 | 0.128 | 0.071 |
| Elastic modulus at 120° C. [MPa] | 2.70 | 15.9 | 8.9 | 65.7 |
| Water content [mass %] | 66 | 223 | 132 | 55 |

Ex. 6

Ex. 6-1

Into a 100 mL container made of polytetrafluoroethylene (PTFE), 4.3 g of a finely cut membrane of polymer H-1 and 75 g of ultrapure water were added, and heated for 24 hours at 200° C. The content was transferred to a PTFE container and air-dried at 30° C. over 64 hours in a nitrogen atmosphere. The dried polymer H-1 was transferred to a 200 mL glass autoclave, and 21.4 g of a mixed solvent of ultrapure water/ethanol (50/50 (mass ratio)) was added. After stirring at 110° C. for 25 hours, 3.87 g of ultrapure water was added for dilution. After stirring at 90° C. for 5 hours, the mixture was left to cool, followed by filtration by using a pressure filter (filter paper: manufactured by ADVANTEC Toyo Kaisha, Ltd., PF040) to obtain 31.9 g of liquid composition S-1 having polymer H-1 dispersed in the mixed solvent.

The liquid composition S-1 was coated on a 100 μm ethylene-tetrafluoroethylene copolymer (ETFE) sheet by a die coater to form a membrane, which was dried at 80° C. for 15 minutes and further subjected to heat treatment at 185° C. for 30 minutes to obtain a polymer electrolyte membrane composed of a membrane of polymer H. The results are shown in Table 5.

Ex. 6-2, Ex. 6-3

Liquid compositions S-2 and S-3 having the solid content concentrations as shown in Table 5 were obtained in the same manner as in Ex. 6-1 except that the amounts of the respective components charged were changed.

A polymer electrolyte membrane composed of a membrane of polymer H was obtained in the same manner as in Ex. 6-1 except that the liquid composition was changed. The results are shown in Table 5.

TABLE 5

|  | Ex. 6-1 | Ex. 6-2 | Ex. 6-3 |
| --- | --- | --- | --- |
| Polymer H used | H-1 | H-2 | H-3 |
| Liquid composition used | S-1 | S-2 | S-3 |
| Solid content concentration [mass %] | 13.5 | 2.1 |  |
| Thickness of membrane [μm] | 25 | 25 | 25 |
| Conductivity [S/cm] | 0.132 | 0.122 | 0.182 |
| Water content [mass %] | 152 | 94 | 249 |
| Hydrogen gas permeation coefficient 1 [$cm^3 \cdot cm/(s \cdot cm^2 \cdot cmHg)$] | $2.1 \times 10^{-9}$ | $1.6 \times 10^{-9}$ | $1.9 \times 10^{-9}$ |
| Hydrogen gas permeation coefficient 2 [$cm^3 \cdot cm/(s \cdot cm^2 \cdot cmHg)$] | $3.0 \times 10^{-9}$ | $2.3 \times 10^{-9}$ | $2.8 \times 10^{-9}$ |

Ex. 7

Ex. 7-1

In an autoclave (internal volume 200 mL, made of glass), 20 g of a finely cut membrane of polymer H'-1 and 56.9 g of a mixed solvent of ethanol/water (60/40 (mass ratio)) were added, and the autoclave was heated with stirring. After stirring at 115° C. for 16 hours, the mixture was left to cool and filtered by using a pressure filter (filter paper: manufactured by ADVANTEC Toyo Kaisha, Ltd., PF040) to obtain 76.5 g of liquid composition S'-1 having polymer H'-1 dispersed in the mixed solvent.

A polymer electrolyte membrane composed of a membrane of polymer H'-1 was obtained in the same manner as in Ex. 6-1 except that the liquid composition S'-1 was used, and the heat treatment temperature was 160° C. for 30 minutes. The results are shown in Table 6.

Ex. 7-2 to Ex. 7-4

In the same manner as in Ex. 7-1 except that the amount of the respective components charged were changed, liquid compositions S'-2 to S'-4 having solid contents as shown in Table 6, were obtained.

In the same manner as in Ex. 7-1 except that the liquid composition and the thickness of the membrane were changed, a polymer electrolyte membrane composed of a membrane of polymer H' was obtained. The results are shown in Table 6.

TABLE 6

|  | Ex. 7-1 | Ex. 7-2 | Ex. 7-3 | Ex. 7-4 |
| --- | --- | --- | --- | --- |
| Polymer H' used | H'-1 | H'-2 | H'-3 | H'-4 |
| Liquid composition used | S'-1 | S'-2 | S'-3 | S'-4 |
| Solid content concentration [mass %] | 26.0 | 15.0 | 2.5 | 8.5 |
| Thickness of membrane [μm] | 25 | 100 | 100 | 100 |
| Conductivity [S/cm] | 0.050 | 0.171 | 0.128 | 0.071 |
| Water content [mass %] | 49 | 223 | 132 | 55 |
| Hydrogen gas permeation coefficient 1 [$cm^3 \cdot cm/(s \cdot cm^2 \cdot cmHg)$] | $5.5 \times 10^{-9}$ | $3.5 \times 10^{-9}$ | $3.3 \times 10^{-9}$ | $3.0 \times 10^{-9}$ |
| Hydrogen gas permeation coefficient 2 [$cm^3 \cdot cm/(s \cdot cm^2 \cdot cmHg)$] | $6.4 \times 10^{-9}$ | $4.2 \times 10^{-9}$ | $4.1 \times 10^{-9}$ | $3.6 \times 10^{-9}$ |

Ex. 8

Ex. 8-1

To the liquid composition S-1, cerium carbonate hydrate ($Ce_2(CO_3)_3 \cdot 8H_2O$) is added so that the ratio of the total number of moles of the cerium atoms to the total number of moles of the sulfonic acid groups in the polymer H-1 becomes 0.0067, and stirred at 50° C. for 24 hours to obtain liquid composition L-1.

The liquid composition L-1 is coated on a 100 μm ETFE sheet by a die coater to form a membrane, which is then dried at 80° C. for 15 minutes and further heat-treated at 185° C. for 30 minutes to obtain a polymer electrolyte membrane having a thickness of 25 μm.

Polymer H'-1 and a mixed solvent of ethanol/water (60/40 (mass ratio)) are mixed to obtain a polymer H'-1 dispersion having a solid content concentration of 25.8 mass %.

221.76 g of water and 174.24 g of ethanol are added to 44 g of a supported catalyst (manufactured by Tanaka Kikinzoku Kogyo) having 46 mass % of platinum supported on carbon powder, and mixed and pulverized by using an ultrasonic homogenizer, to obtain a dispersion liquid of the catalyst. To the dispersion liquid of the catalyst, 102.06 g of a mixed liquid having 80.16 g of a polymer H'-1 dispersion, 44.4 g of ethanol and 25.32 g of ZEORORA H (manufactured by Zeon Corporation) mixed and kneaded in advance, is added, further, 26.77 g of water and 12 g of ethanol are added and mixed by using an ultrasonic homogenizer to bring the solid content concentration to 10 mass %, then a coating liquid for forming a catalyst layer is obtained. The liquid is applied onto an ETFE sheet by a die coater, dried at 80° C., and further subjected to heat-treatment at 160° C. for 30 minutes to form a catalyst layer having a platinum content of 0.4 mg/cm$^2$.

To 50 g of vapor-grown carbon fiber (manufactured by Showa Denko K.K., trade name: VGCF-H, fiber diameter of about 150 nm, fiber length of from 10 to 20 μm), 81.6 g of ethanol and 154.4 g of distilled water are added and stirred well. To this, 89 g of an acid-type sulfonic acid group-containing fluorocarbon polymer (manufactured by AGC Inc., trade name: FLEMION, ion exchange capacity: 1.1 meq/g, solid content concentration: 28.1%) is added and stirred well, and further, mixing and pulverization are conducted by using an ultrasonic homogenizer to prepare a coating liquid for forming an intermediate layer.

The coating liquid for forming an intermediate layer is applied to the surface of a gas diffusion base material (manufactured by NOK, trade name: X0086 T10X13) by using a die coater so that the solid content becomes 3 mg/cm$^2$ and dried at 80° C., then a gas diffusion base material with an intermediate layer having an intermediate layer formed on the surface of the carbon non-woven fabric is obtained.

A polymer electrolyte membrane is sandwiched between two ETFE sheets with a catalyst layer, and hot-pressed under the conditions of a press temperature of 160° C., a press time of 2 minutes and a pressure of 3 MPa, to bond catalyst layers on both sides of the polymer electrolyte membrane, whereupon the ETFE films are peeled off from the catalyst layers to obtain a membrane catalyst layer assembly having an electrode area of 25 cm$^2$.

A gas diffusion base material with a carbon layer (manufactured by NOK, trade name: X0086 IX92 CX320) and a gas diffusion base material with an intermediate layer are disposed on the anode side and the cathode side of the membrane catalyst layer assembly respectively, so that the carbon layer and the intermediate layer are in contact with the catalyst layer side. By hot pressing at a pressing temperature of 160° C., a pressing time of 2 minutes and a pressure of 3 MPa, a membrane electrode assembly to be used for evaluation of initial power generation characteristics and evaluation of hydrogen leakage amount, is prepared. The results are shown in Table 7.

A gas diffusion base material with a carbon layer (manufactured by NOK, trade name: X0086 IX92 CX320) calcinated at 350° C. for 2 hours and a gas diffusion base material with a carbon layer (manufactured by NOK, trade name: H2315 T10X6 CX96 modified) calcinated at 350° C. for 2 hours are disposed on the anode side and the cathode side of the membrane catalyst layer assembly respectively, so that the carbon layers are in contact with the catalyst layer side, and by sandwiching the membrane electrode assembly between the gas diffusion base materials, a membrane electrode assembly to be used for evaluation of durability, is prepared. The results are shown in Table 7.

Ex. 8-2 to Ex. 8-4, Ex. 8-8

In the same manner as in Ex. 8-1 except that the amount of charged cerium carbonate hydrate is changed, liquid compositions L-2 to L-4 and L-8 as shown in Table 7 are obtained.

In the same manner as in Ex. 8-1, except that the liquid composition is changed, a polymer electrolyte membrane is obtained.

In the same manner as in Ex. 8-1, except that the polymer electrolyte membrane is changed, a membrane electrode assembly is obtained. The results are shown in Table 7.

Ex. 8-5

Cerium oxide was added to the liquid composition S-1 so that the ratio of the total number of moles of the cerium atoms to the total number of moles of the sulfonic acid groups in the polymer H-1 becomes 0.033, and after adding zirconia beads having a diameter of 5 mm, the mixture is mixed and dispersed at a rotation speed of 300 rpm for 30 minutes by using a planetary bead mill. Filtration is performed by using a 53 μm stainless mesh to obtain liquid composition L-5 as shown in Table 7.

In the same manner as in Ex. 8-1, except that the liquid composition is changed, a polymer electrolyte membrane is obtained.

In the same manner as in Ex. 8-1, except that the polymer electrolyte membrane is changed, a membrane electrode assembly is obtained. The results are shown in Table 7.

Ex. 8-6

In the same manner as in Ex. 8-5, except that the amount of charged cerium oxide is changed, liquid composition L-6 as shown in Table 7 is obtained.

In the same manner as in Ex. 8-1, except that the liquid composition is changed, a polymer electrolyte membrane is obtained.

In the same manner as in Ex. 8-1, except that the polymer electrolyte membrane is changed, a membrane electrode assembly is obtained. The results are shown in Table 7.

Ex. 8-7, Ex. 8-9

In the same manner as in Ex. 8-1 except that the liquid composition S-1 is changed to the liquid composition S-2 or S-3 and the amount of charged cerium carbonate hydrate is changed, liquid composition L-7 or L-9 as shown in Table 7 is obtained.

In the same manner as in Ex. 8-1, except that the liquid composition is changed, a polymer electrolyte membrane is obtained.

In the same manner as in Ex. 8-1, except that the polymer electrolyte membrane is changed, a membrane electrode assembly is obtained. The results are shown in Table 7.

TABLE 7

| | Ex. 8-1 | Ex. 8-2 | Ex. 8-3 | Ex. 8-4 | Ex. 8-5 | Ex. 8-6 | Ex. 8-7 | Ex. 8-8 | Ex. 8-9 |
|---|---|---|---|---|---|---|---|---|---|
| Polymer H' used | H-1 | H-1 | H-1 | H-1 | H-1 | H-1 | H-2 | H-1 | H-3 |
| Liquid composition used | L-1 | L-2 | L-3 | L-4 | L-5 | L-6 | L-7 | L-8 | L-9 |
| Form of cerium atoms | Cerium ions | Cerium ions | Cerium ions | Cerium ions | Cerium oxide | Cerium oxide | Cerium ions | Cerium ions | Cerium ions |
| Ratio of total number of moles of cerium atoms to total number of moles of sulfonic acid groups | 0.0067 | 0.017 | 0.033 | 0.067 | 0.033 | 0.017 | 0.033 | 0.10 | 0.033 |
| Initial power generation characteristics | ⊚ | ⊚ | ○ | Δ | ○ | ⊚ | ○ | Δ | ⊚ |
| Durability | ○ | ○ | ○ | ⊚ | ○ | ○ | ○ | ⊚ | ○ |
| Hydrogen gas permeability | ○ | ○ | ○ | ○ | ○ | ○ | ⊚ | ○ | ○ |

Ex. 9

Ex. 9-1

In the same manner as in Ex. 8-1 except that the liquid composition L-1 is changed to the liquid composition S-1, a polymer electrolyte membrane is obtained.

In the same manner as in Ex. 8-1, except that the polymer electrolyte membrane is changed, a membrane electrode assembly is obtained. The results are shown in Table 8.

Ex. 9-2

In the same manner as in Ex. 8-1 except that the liquid composition L-1 is changed to the liquid composition S'-1 and the heat treatment temperature is changed to be 160° C. for 30 minutes, a polymer electrolyte membrane is obtained. In the same manner as in Ex. 8-1, except that the polymer electrolyte membrane is changed, a membrane electrode assembly is obtained. The results are shown in Table 8.

Ex. 9-3 to Ex. 9-6

In the same manner as in Ex. 8-1, except that the liquid composition S-1 is changed to the liquid compositions S'-1 to S'-4, liquid compositions L'-1 to L'-4 are obtained.

In the same manner as in Ex. 9-2, except that the liquid composition is changed, a polymer electrolyte membrane is obtained.

In the same manner as in Example 8-1, except that the polymer electrolyte membrane is changed, a membrane electrode assembly is obtained. The results are shown in Table 8.

INDUSTRIAL APPLICABILITY

The polymer electrolyte membrane of the present invention is useful as a polymer electrolyte membrane in a membrane electrode assembly for a polymer electrolyte fuel cell.

This application is a continuation of PCT Application No. PCT/JP2019/047938, filed on Dec. 6, 2019, which is based upon and claims the benefit of priority from Japanese Patent Application No. 2018-230215 filed on Dec. 7, 2018. The contents of those applications are incorporated herein by reference in their entireties.

REFERENCE SYMBOLS

10: membrane electrode assembly, 11: catalyst layer, 12: gas diffusion layer, 13: anode, 14: cathode, 15: polymer electrolyte membrane, 16: carbon layer.

What is claimed is:

1. A liquid composition comprising a liquid medium, an acid-type sulfonic acid group-containing fluorocarbon polymer comprising units represented by the following formula u1, and cerium atoms:

Formula u1 where $R^{F1}$ and $R^{F2}$ are each independently a $C_{1-3}$ perfluoroalkylene group.

2. The liquid composition according to claim 1, wherein a ratio of a total number of moles of the cerium atoms to a total number of moles of the sulfonic acid groups contained

TABLE 8

| | Ex. 9-1 | Ex. 9-2 | Ex. 9-3 | Ex. 9-4 | Ex. 9-5 | Ex. 9-6 |
|---|---|---|---|---|---|---|
| Polymer H/polymer H' used | H-1 | H'-1 | H'-1 | H'-2 | H'-3 | H'-4 |
| Liquid composition used | S-1 | S'-1 | L'-1 | L'-2 | L'-3 | L'-4 |
| Form of cerium atoms | — | — | Cerium ions | Cerium ions | Cerium ions | Cerium ions |
| Ratio of total number of moles of cerium atoms to total number of moles of sulfonic acid groups | — | — | 0.033 | 0.033 | 0.033 | 0.033 |
| Initial power generation characteristics | ⊚ | X | X | ⊚ | ○ | X |
| Durability | X | X | ○ | ○ | ○ | ○ |
| Hydrogen gas permeability | ○ | X | X | X | X | X | in the acid-type sulfonic acid group-containing fluorocarbon polymer, is from 0.001 to 0.13.

3. The liquid composition according to claim 1, wherein an ion exchange capacity of the acid-type sulfonic acid group-containing fluorocarbon polymer is from 0.5 to 2.5 meq/g dry resin.

4. The liquid composition according to claim 1, wherein a hydrogen gas permeation coefficient under conditions of a temperature of 80° C. and a relative humidity of 10% of the acid-type sulfonic acid group-containing fluorocarbon polymer comprising units represented by formula u1 is at most $2.5 \times 10^{-9}$ $cm^3 \cdot cm/(s \cdot cm^2 \cdot cmHg)$.

5. A polymer electrolyte membrane comprising an acid-type sulfonic acid group-containing fluorocarbon polymer comprising units represented by the following formula u1, and cerium atoms:

Formula u1 where $R^{F1}$ and $R^{F2}$ are each independently a $C_{1-3}$ perfluoroalkylene group.

6. The polymer electrolyte membrane according to claim 5, wherein a ratio of the total number of moles of the cerium atoms to a total number of moles of the sulfonic acid groups contained in the acid-type sulfonic acid group-containing fluorocarbon polymer is from 0.001 to 0.13.

7. The polymer electrolyte membrane according to claim wherein an ion exchange capacity of the acid-type sulfonic acid group-containing fluorocarbon polymer is from 0.5 to 2.5 meq/g dry resin.

8. The polymer electrolyte membrane according to claim 5, wherein a hydrogen gas permeation coefficient under conditions of a temperature of 80° C. and a relative humidity of 10% of the acid-type sulfonic acid group-containing fluorocarbon polymer comprising units represented by formula u1 is at most $2.5 \times 10^{-9}$ $cm^3 \cdot cm/(s \cdot cm^2 \cdot cmHg)$.

9. A membrane electrode assembly comprising an anode comprising a catalyst layer, a cathode comprising a catalyst layer, and the polymer electrolyte membrane as defined in claim 5 disposed between the anode and the cathode.

10. A polymer electrolyte fuel cell comprising the membrane electrode assembly as defined in claim 9.

11. The liquid composition according to claim 1, wherein:
a ratio of a total number of moles of the cerium atoms to a total number of moles of the sulfonic acid groups contained in the acid-type sulfonic acid group-containing fluorocarbon polymer, is from 0.001 to 0.13;
an ion exchange capacity of the acid-type sulfonic acid group-containing fluorocarbon polymer is from 0.5 to 2.5 meq/g dry resin;
a hydrogen gas permeation coefficient under conditions of a temperature of 80° C. and a relative humidity of 10% of the acid-type sulfonic acid group-containing fluorocarbon polymer comprising units represented by formula u1 is at least $1.0 \times 10^{-12}$ $cm^3 \cdot cm/(s \cdot cm^2 \cdot cmHg)$ and at most $2.5 \times 10^{-9}$ $cm^3 \cdot cm/(s \cdot cm^2 \cdot cmHg)$;
the liquid medium comprises an organic solvent and water wherein a proportion of the organic solvent is from 1 to 80 mass % and a proportion of the water is from 20 to 99 mass % based on a total of water and organic solvent; and
the acid-type sulfonic acid group-containing fluorocarbon polymer further comprises tetrafluroethylene units.

12. The liquid composition according to claim 1, wherein $R^{F1}$ and $R^{F2}$ are each a $C_1$ perfluoroalkylene group.

13. The liquid composition according to claim 11, wherein $R^{F1}$ and $R^{F2}$ are each a $C_1$ perfluoroalkylene group.

14. The polymer electrolyte membrane according to claim 5, wherein:
a ratio of a total number of moles of the cerium atoms to a total number of moles of the sulfonic acid groups contained in the acid-type sulfonic acid group-containing fluorocarbon polymer, is from 0.001 to 0.13;
an on exchange capacity of the acid-type sulfonic acid group-containing fluorocarbon polymer is from 0.5 to 2.5 meq/g dry resin;
a hydrogen gas permeation coefficient under conditions of a temperature of 80° C. and a relative humidity of 10% of the acid-type sulfonic acid group-containing fluorocarbon polymer comprising units represented by formula u1 is at least $1.0 \times 10^{-12}$ $cm^3 \cdot cm/(s \cdot cm^2 \cdot cmHg)$ and at most $2.5 \times 10^{-9}$ $cm^3 \cdot cm/(s \cdot cm^2 \cdot cmHg)$; and
the acid-type sulfonic acid group-containing fluorocarbon polymer further comprises tetrafluroethylene units.

15. The polymer electrolyte membrane according to claim 5, wherein $R^{F1}$ and $R^{F2}$ are each a $C_1$ perfluoroalkylene group.

16. The polymer electrolyte membrane according to claim 14, wherein $R^{F1}$ and $R^{F2}$ are each a $C_1$ perfluoroalkylene group.

17. A membrane electrode assembly comprising an anode comprising a catalyst layer, a cathode comprising a catalyst layer, and the polymer electrolyte membrane as defined in claim 14 disposed between the anode and the cathode.

18. A polymer electrolyte fuel cell comprising the membrane electrode assembly as defined in claim 17.

* * * * *